United States Patent [19]
Hariki et al.

[11] Patent Number: 5,084,826
[45] Date of Patent: Jan. 28, 1992

[54] INDUSTRIAL ROBOT SYSTEM

[75] Inventors: Kazuo Hariki; Tatsuya Koizumi; Kazuya Ishiguro; Kiyoshi Kanitani, all of Toyama; Masaki Togitani; Kazuyuki Doi, both of Hatsukaichi; Shin-ichi Izumisawa, Hiroshima, all of Japan

[73] Assignees: Nachi-Fujikoshi Corp., Toyama; Nihon Sogyo Kabushiki Kaisha, Hiroshima, both of Japan

[21] Appl. No.: 557,074

[22] Filed: Jul. 25, 1990

[30] Foreign Application Priority Data

Jul. 27, 1989 [JP] Japan ............................. 1-192646

[51] Int. Cl.⁵ .............................................. G05B 19/00
[52] U.S. Cl. .......................................... 395/83; 901/6; 901/8
[58] Field of Search ................. 364/513; 901/6, 8

[56] References Cited
U.S. PATENT DOCUMENTS 4,777,608 10/1988 Hashimoto et al. ................. 364/513
4,890,241 12/1989 Hoffman et al. .................... 364/513

Primary Examiner—Allen R. MacDonald
Attorney, Agent, or Firm—Spencer & Frank

[57] ABSTRACT

An industrial robot system comprising a single working machine, and a plurality of robots arranged so as to transfer a work to and from this working machine. The operation of these robots and the working machine is controlled by a single control unit, and the operation of all the robots is controlled in a realtime manner in synchronism with the operation of the working machine, thereby ensuring the smooth operation of the overall system while obviating waiting time of each robot and the working machine without using a conventional mutual interlock system. The control unit is set so that clocks of the robots and the working machine and the system clock are counted up in the same cycle time, simultaneously therewith the original point clock value of the robot or the working machine located on the most upstream side of the system is set as the original clock value of the system, and each of the robots and the working machine is operated as the count of the system clock reaches the original clock value of the robot on the working machine.

4 Claims, 23 Drawing Sheets

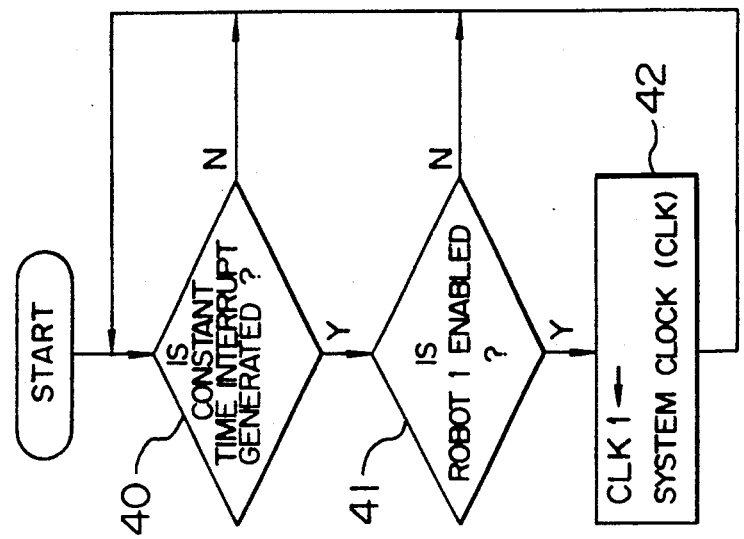
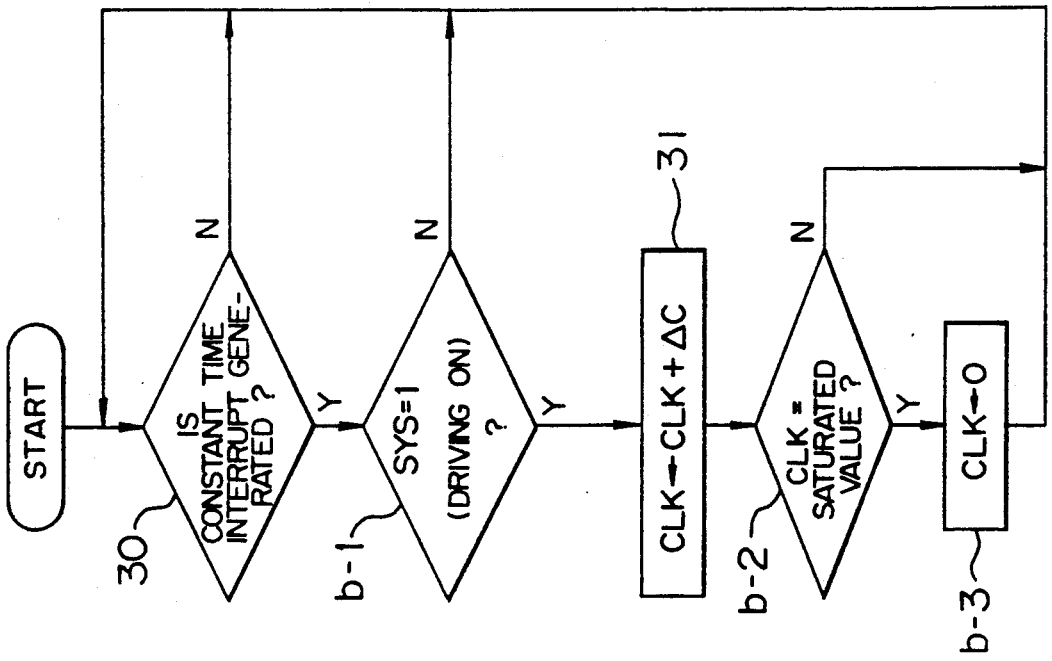

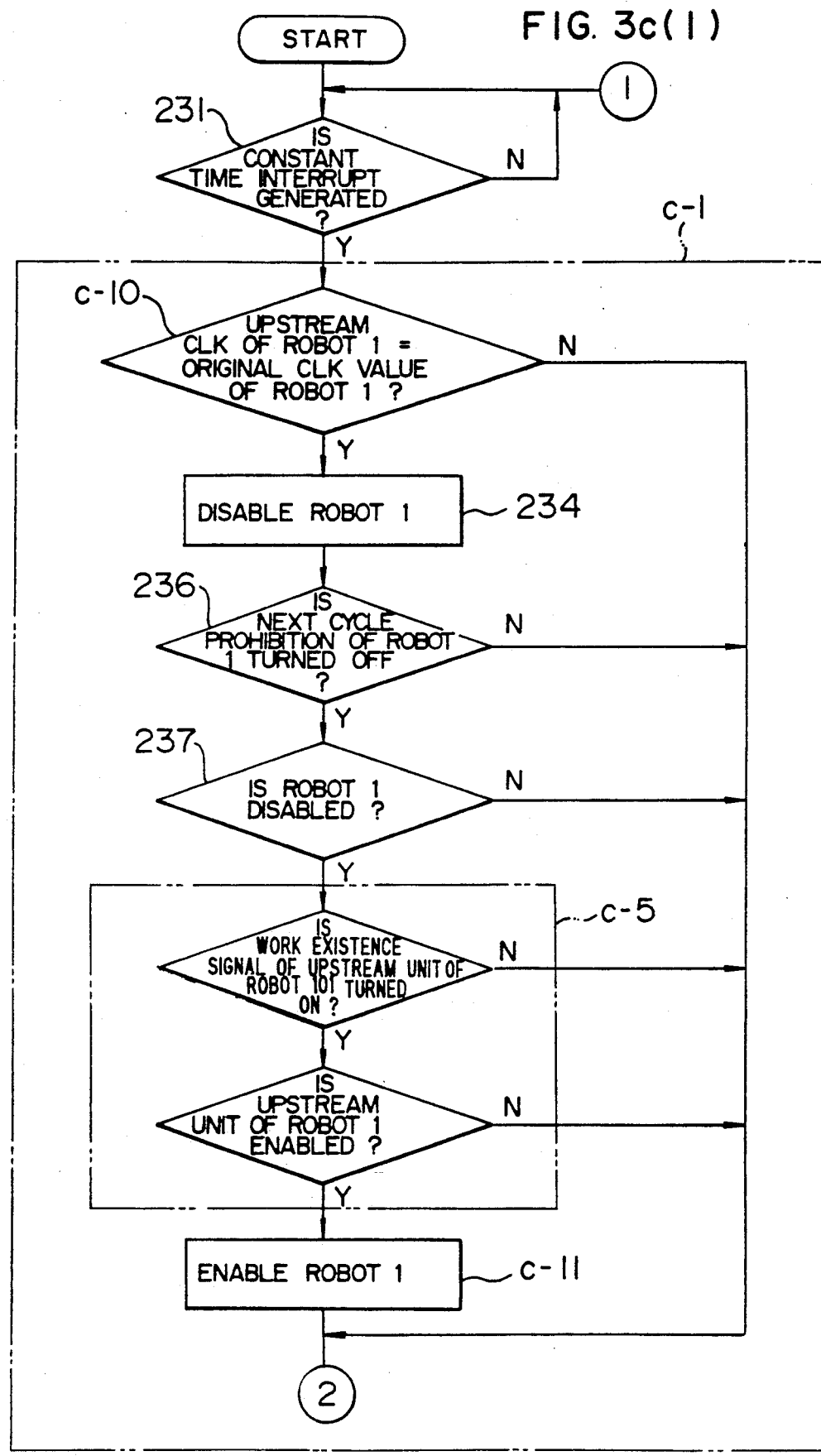

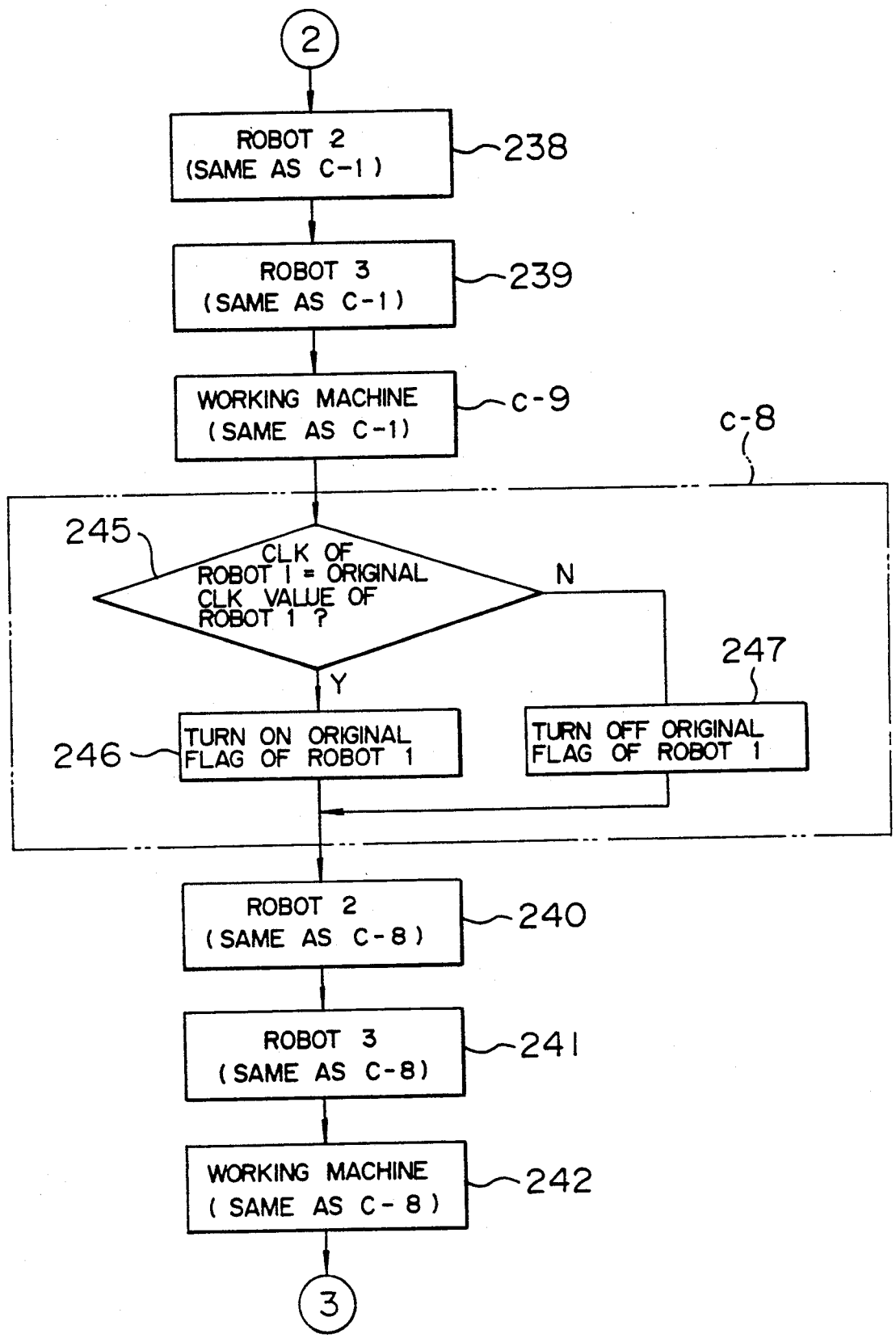
FIG. 3c(2)

FIG. 3c(3)
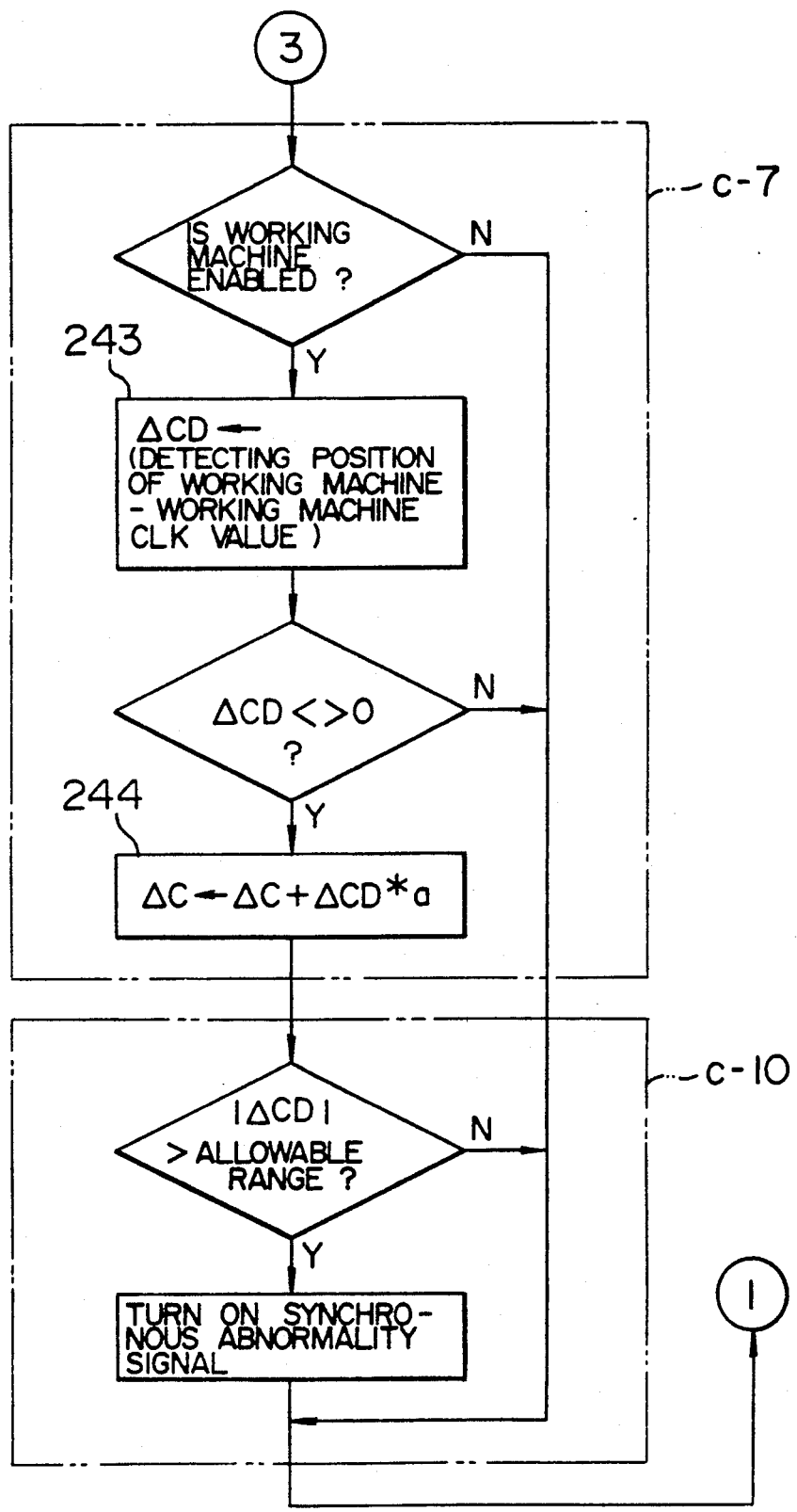

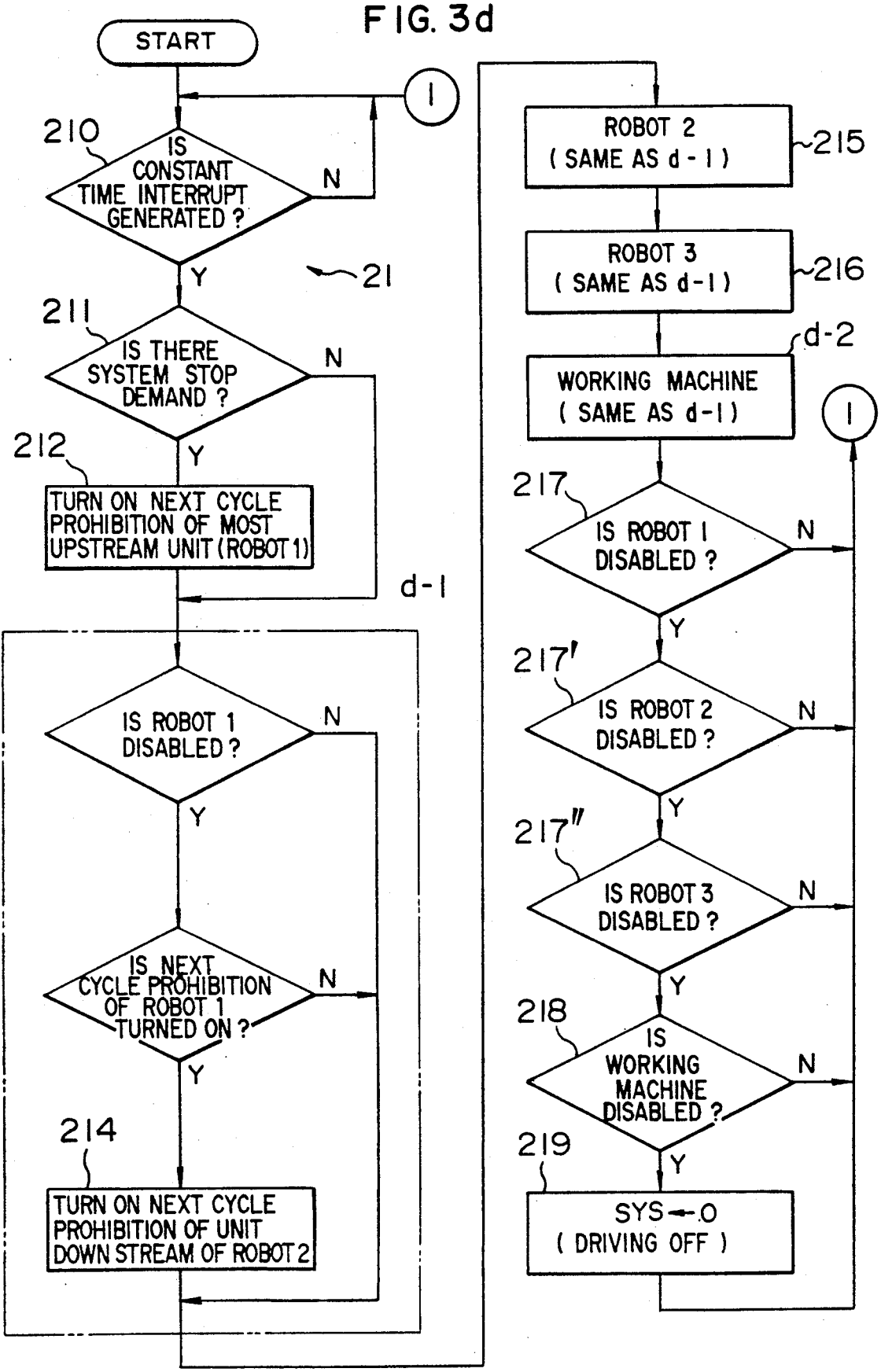

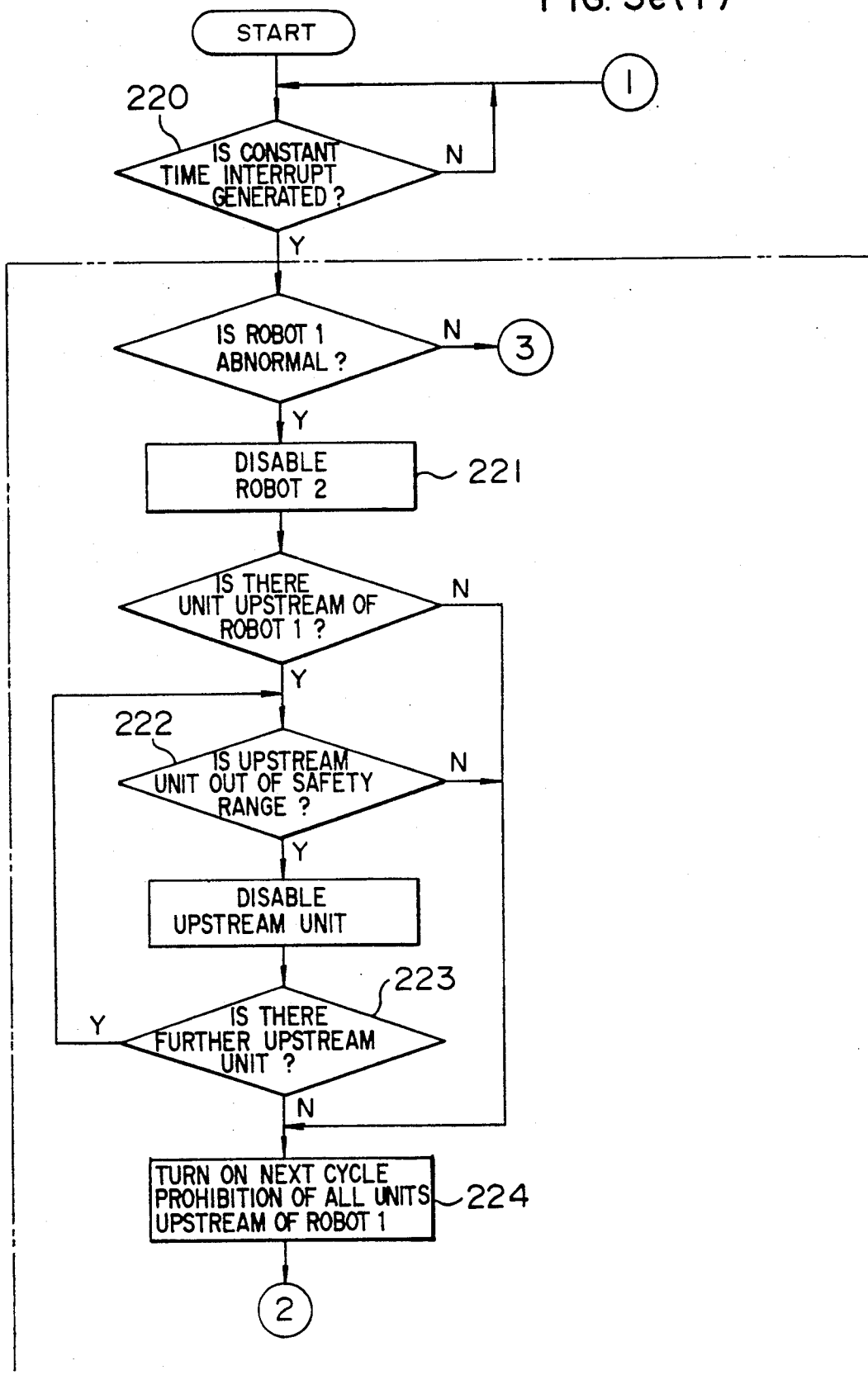
FIG. 3e(1)

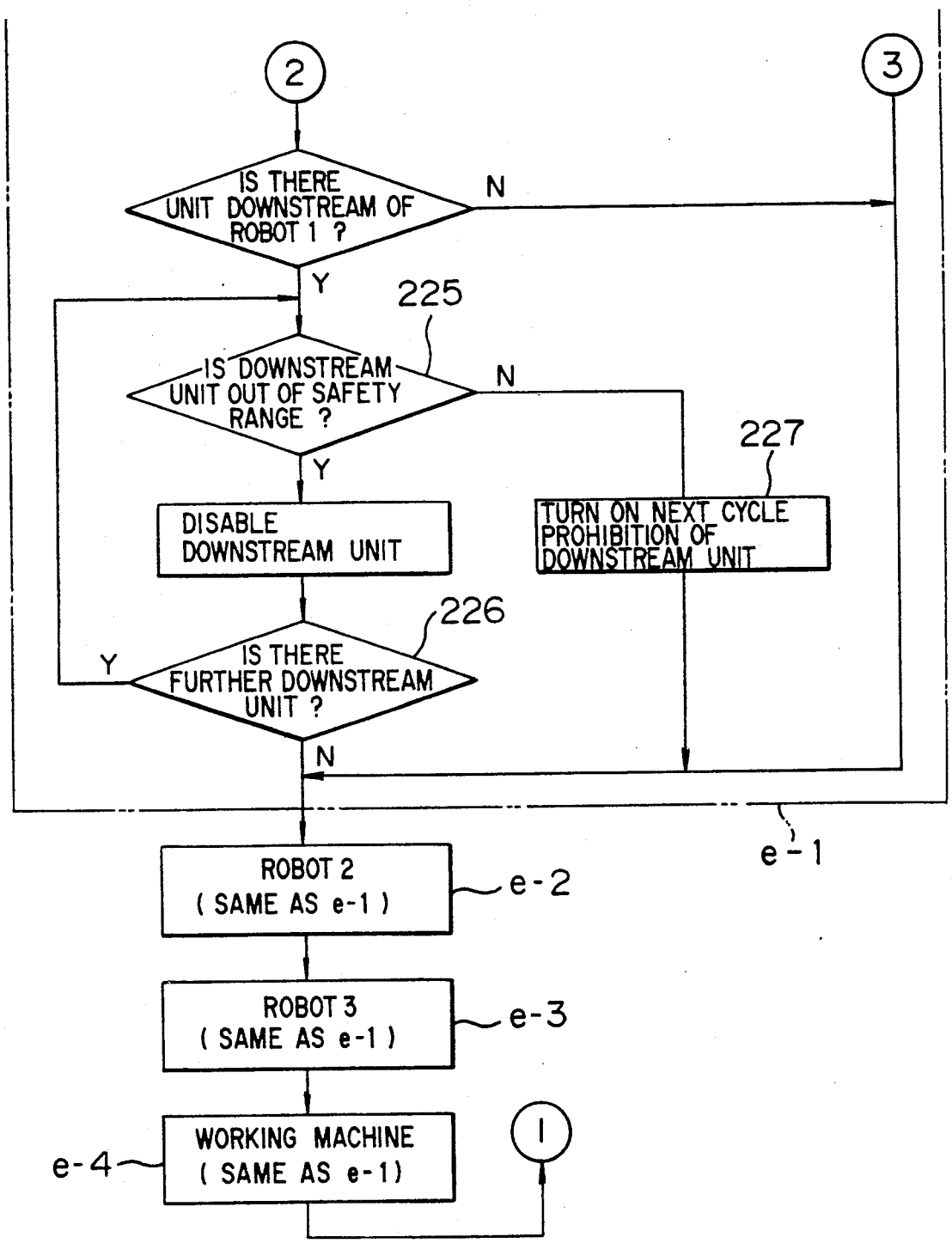
FIG. 3e(2)

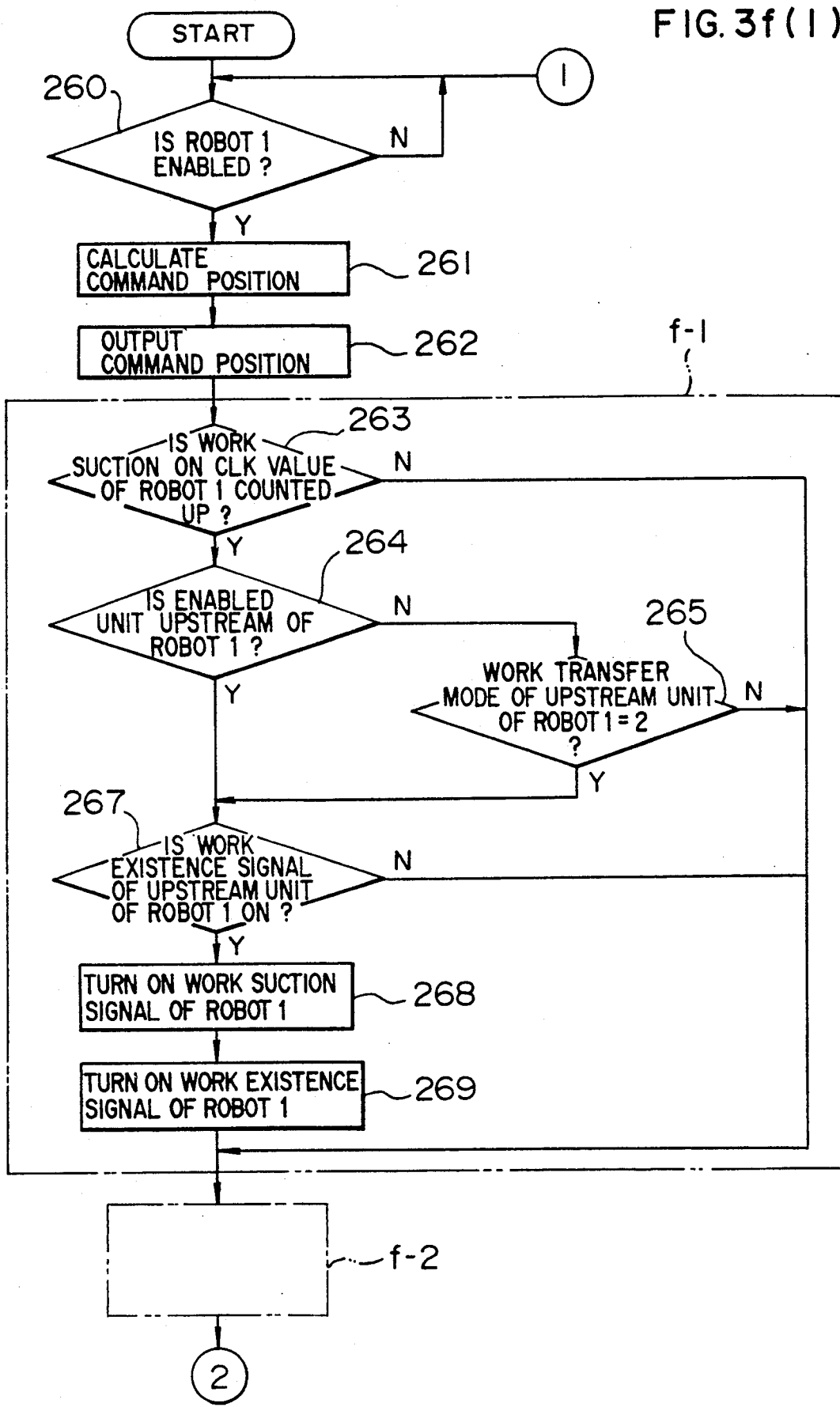
FIG. 3f(1)

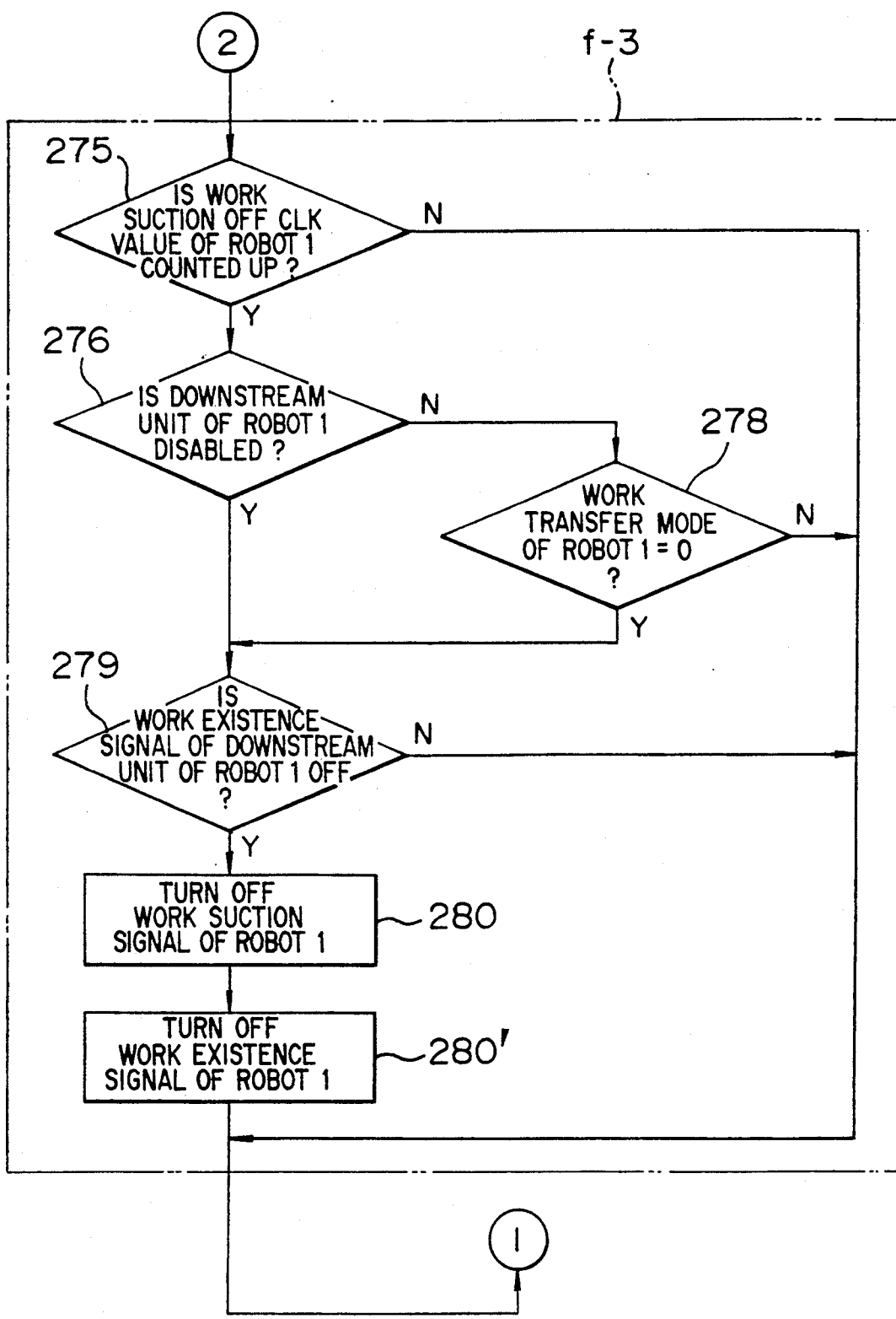
FIG. 3f(2)

INDUSTRIAL ROBOT SYSTEM

BACKGROUND OF THE INVENTION

The present invention relates to an industrial robot system in which a plurality of robots each having one or more axes are controlled by a single control unit, and all the robots may be simultaneously operated in synchronism with working machines additionally provided in the system.

A conventional industrial robot is composed of a single control unit, a single machine body and a teaching controller for generating commands for teaching. In the case where a work is machined or conveyed by using a plurality of robots, of course, a plurality of control units are to be used. Then, the robots must machine or convey the work is synchronism with mutual interlock signals. For such a synchronism according to the mutual interlock signals, there has been a method for starting the operation after it has been detected that the associated robot is located at a predetermined position and it is confirmed that the subject robot does not interfere with the associated robot even if the subject robot is operated.

According to this method, the robot is operated always after the confirmation that the associated robot is stopped at the predetermined position or is not located in the operational area where the subject robot is to be moved. For this reason, it is necessary to take a waste waiting period of time longer than necessary for the operation itself.

Also, when the work is transferred to the other associated robot or is received from the associated robot, it is impossible to control the relative moving speed of hands of these robots down to zero. It is therefore necessary to give and take the work under the condition that the respective robots are held in a stationary manner. For this reason, the acceleration and deceleration of the robot bodies are carried out more frequently than necessary, which would shorten a mechanical service life of the robots and would lead to waste consumption of energy.

This is also in the case when the working machine is present within the robotic system and the robots feed the work to the working machine or pick up the work therefrom. It is impossible for the robot to feed or pick up the work after the confirmation that the working machine has been located at the predetermined waiting position.

Thus, the conventional system composed of the plurality of robots and working machine suffers from the disadvantage that the acceleration and deceleration are repeated with the consumption of energy, and the cycle time is longer than necessary. Therefore, it is impossible to operate the system with a high efficiency.

Also, a conventional robotic program is composed of elements such steps for representing the reproduction order of the program, step data for representing the physical position of the steps, a time period for the movement between the steps, and some input/output signal processing for each step.

The movement period between the steps represents a designated time period for the movement between two positions, which time period has a difference from the actual movement time. Although the total of the designated time periods of the respective steps should be the cycle time, each step has an error and the error is accumulated to generate a large error for the cycle time as a whole. Furthermore, in the conventional positional control method, commanded positional data are designated for a subsequent step after the confirmation that the robot has reached the commanded position. For this reason, the waiting time is added to the cycle time for every step, and it is impossible to determine the cycle time unless the system is actually operation.

Even if the plurality of robots are controlled by a single control unit, it is impossible to make the cycle times of all the robots at the same one in accordance with the foregoing positional control method. Accordingly, although signal wires are not actually connected to each other, the synchronizing method for the robots within the system is equivalent to the mutual interlock method.

SUMMARY OF THE INVENTION

An object of the invention is to provide an industrial robot system which is capable of continuously operating respective robots and a working machine without any waiting time.

Another object of the invention is to provide an industrial robot system in which robots and a working machine, whose operational speeds are different from each other, may be smoothly operated in synchronism with each other.

Still another object of the invention is to provide an industrial robot system which is smoothly operated in a continuous manner or a one-cycle batch manner in response to starting by operator.

Still another object of the invention is to provide a composite system which is composed of a plurality of robot systems connected in series with each other so that the respective systems are smoothly operated in a continuous manner without any interference therebetween.

According to the invention, there are provided industrial robot systems as defined in the appended claims, to thereby attain these and other objects while solving problems inherent in the prior art.

In view of the problems of the prior art, according to the invention, a mutual interlock is removed, and all the robots and the working machine is operated without any stop motion, whereby a waste time of the system is obviated to realize a high efficiency robot system.

In order to remove the mutual interlock, a single control unit is used and a plurality of robots are operated in synchronism by the single control unit. It is thus possible to control or manage a position of one unit to a position of the associated unit. Also in the transfer of the work, it is unnecessary to stop the robots.

Furthermore, according to the invention, the method for forming a program is changed so that cycle times of a plurality of robots and a working machine are controlled in the same way. In addition, all the robots operations may follow the operational change of the working machine in a real-time manner, to thereby dispense with the mutual interlock. It is thus possible to realize an economical robot system without stopping each of the robots and the working machine.

On the other hand, in order to transfer the work without stopping the robots, it is necessary to reduce the acceleration/deceleration of each robot as much as possible, and to set the relative speed of the robots at the same level upon the work transferring operation while keeping change of the relative positions at zero. For this end, a synchronism method which can keep the cycle times at the same level must be adopted and the optimum operation locus must be set. It is very important how the locus which suppresses the acceleration/deceleration of each axis of the robot at minimum level is selected. This largely affects the cycle time and the service life of the overall system. According to the present invention, this locus is uniquely proposed to realize an optimum system.

Even if the cycle time of the single system is controlled in an optimum condition, when a plurality of systems are connected to each other, if conveyors or the like are used for transferring the work between the systems, it is necessary to again position the work at the upstream side of the next system. Thus, it is impossible to offer the ability of an individual system. Therefore, according to the invention, the interconnection between the systems are considered in advance. Namely, the work is transferred or delivered to the outlet with the work being positioned or aligned, to thereby make it possible to connect the system directly with the other system. In addition, an initializing means for the mutual systems is proposed. Thus, it is possible to form a composite system for ideal production, in which a cycle is short and an energy consumption is saved without any waste time or stopping each element of the systems.

In sum, according to the invention, a plurality of robots and a working machine are controlled by the same clock, whereby these units are automatically operated without any mutual interlock. Also, in the transfer of the work between the robots, since it is possible to reduce the relative speed therebetween down to zero, it is possible to perform the transfer. Accordingly, it is unnecessary to take a mutual interlock between the plurality of robots unlike the prior art. It is of course possible to keep one robot for waiting in accordance with the condition of the other robot. By eliminating the waiting condition, it is possible to reduce a waste energy at a minimum level, which could not be attained according to the prior art. Since it is possible to suppress a rapid acceleration/deceleration such as stop-start and start-stop, it is possible to prolong a mechanical service life.

A method of continuously operating the working machine in the system according to a first aspect of the invention, a method of intermittently operating the working machine in the system according to a second aspect of the invention, and a method of operating the working machine after the casting of the work by the operator in the system according to a third aspect of the invention may be all performed by the same teaching program and substantially the same routine, thus enhancing a versatility of the system and performing an effective application thereof. Furthermore, according to a fourth aspect of the invention, it is possible to interconnect the above-described plural systems with each other with a simple method, and it is possible to readily design and change a line of these systems.

BRIEF DESCRIPTION OF THE DRAWINGS

In the accompanying drawings:

FIG. 3b is a flowchart of a process of a system clock counting section shown in FIG. 2;

FIGS. 3c(1) to 3c(3) are a flowchart showing in detail a process of a clock supervising routine shown in FIG. 3a;

FIG. 3d is a flowchart showing in detail a process of a process of a stop checking routine shown in FIG. 3a;

FIGS. 3e(1) and 3e(2) are a flowchart showing in detail a process of an abnormality checking routine shown in FIG. 3a;

FIGS. 3f(1) and 3f(2) are a flowchart of a process of robot 1 controlling section shown in FIG. 2;

FIG. 3g is a flowchart of a process of a robot clock counting section shown in FIG. 2;

FIG. 9b is a diagram for illustrating a working machine drive timing of the robot system shown in FIG. 9a;

DESCRIPTION OF THE PREFERRED EMBODIMENTS

Embodiments of the invention will now be described with reference to the accompanying drawings.

Figure 1:
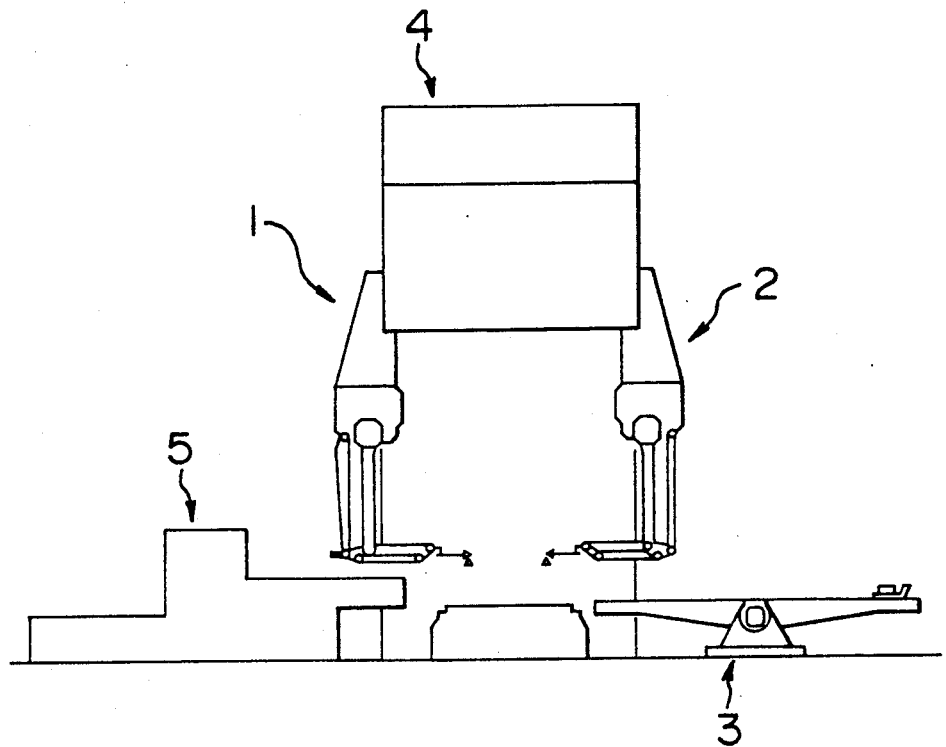
FIG. 1 is a schematic view showing the overall structure of an industrial robot system in accordance with an embodiment of a first aspect of the invention.

FIG. 1 shows an industrial robot system in accordance with one aspect of an embodiment of the invention, which is illustrated as an example of the system including three robots 1, 2 and 3 and a single working machine 4. In this system, the first robot 1 serves as a first loader, the second robot 2 serves a first unloader, the third robot 3 serves as a first shuttle feeder, and the working machine 4 serves as a first pressing unit, respectively. In operation, the first loader 1 casts a work (not shown) fed from a destach feeder (work supplying apparatus) 5 to the first pressing unit 4. After the working of the first pressing unit 4, the first unloader 2 picks up the work and transfers it to the first shuttle feeder 3. The first shuttle feeder 3 conveys the machined work up to the most downstream side of the system.

The three robots 1, 2 and 3 causes their positions to correspond to clock signals (not shown) and are taught so as to transfer the work from the upstream side to the downstream side of the system in accordance with increments of the clock signals. On the other hand, the working unit 4 receives a start signal from a single robot control unit to operate when the start signal is ON and to stop when the start signal is OFF. Except for these controls, the working unit 4 itself performs its controls. Also, the working unit 4 is so constructed as to turn, back to the robot control unit, a working unit abnormal signal when the working unit itself has a malfunction, a working unit start signal during the operation, and a working unit stop signal during the stop of the working unit. Further, a means (encoder) for generating a clock signal in response to the working process is mounted on the working unit 4, so that the robot control unit receives the clock signal to thereby correspond itself to the clock signal of the working unit 4.

Furthermore, the destach feeder or work supplying unit 5 serves to output a work existence signal and an operation continuing or driving signal, to be regarded as an enable signal, to the robot control unit.

Table 1 shows the arrangement of the units downstream and upstream of the robotic system, the clock units upstream and downstream of the system, and the work, transfer subsystem. The original point of each unit is provided before the position where the work is received or is machined and is set as shown in Table 1. Also, the increment value and the saturated value of the clock signals are set in advance before the start of the system. The system is operated while using the working machine 4 as a master unit. The working unit 4 is continuously operated after it is started. Incidentally, as well known in the art, each clock signal is repeatedly generated at regular intervals to be counted up. This counting is performed from zero up to a certain number of the clock signals, and is repeated after the clock signals generated has amounted to this certain number. The increment value means the number of the clock signals increasing at every regular time period, and the saturated value means the certain number of the clock signals at which the counting renews.

Figure 2:
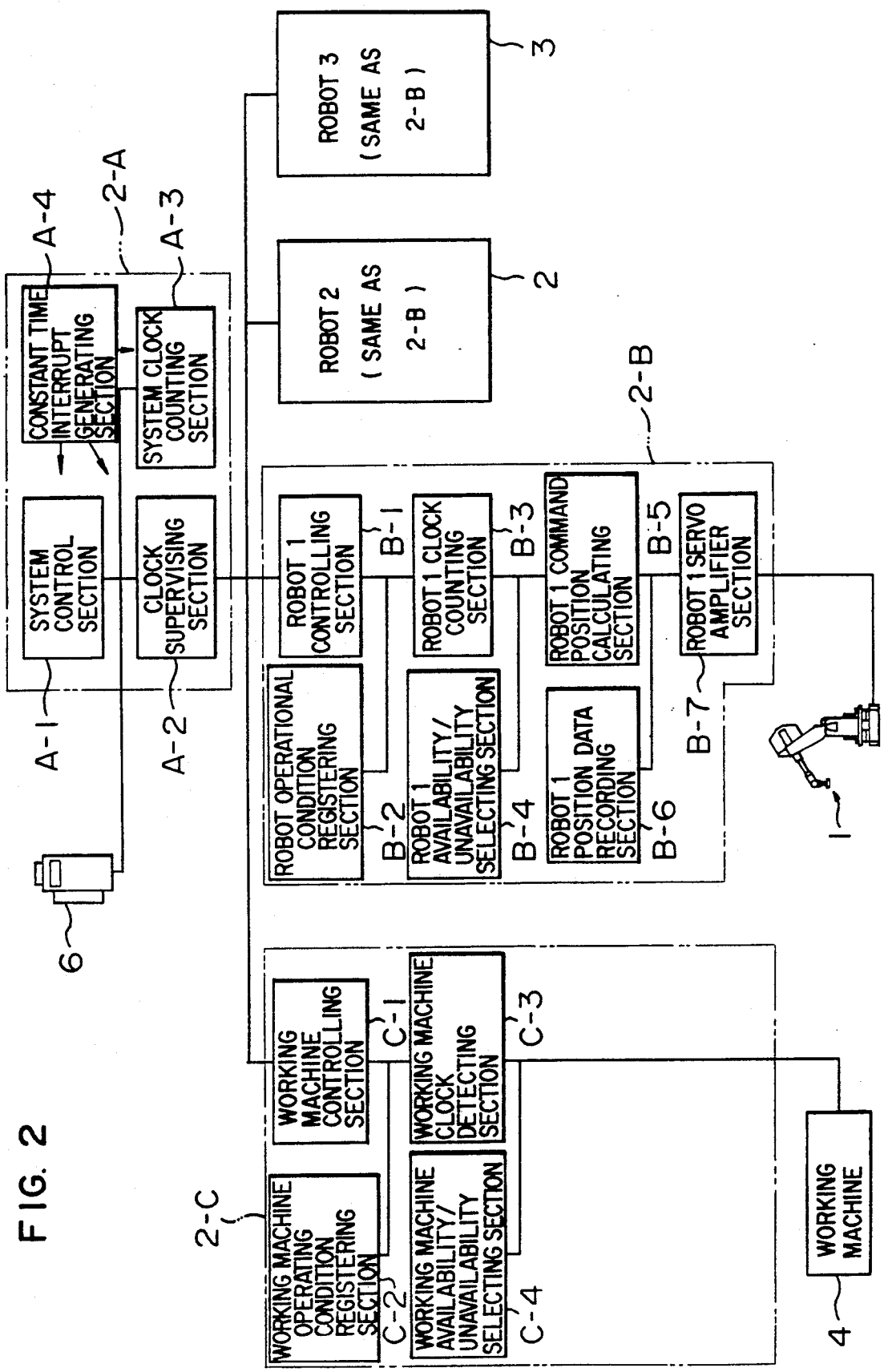
FIG. 2 is a block diagram showing the system shown in FIG. 1.

Subsequently, the control structure and operation of the system according to this embodiment will now be described with reference to FIGS. 2 and 3a to 3i. FIG. 2 is a block diagram showing the system, and FIGS. 3a to 3i are control flowcharts.

A section 2-A in FIG. 2 is composed of a system control section A-1, a clock supervising section A-2, a system clock counting section A-3, and a constant time interrupt generating section A-4.

Figure 3A:
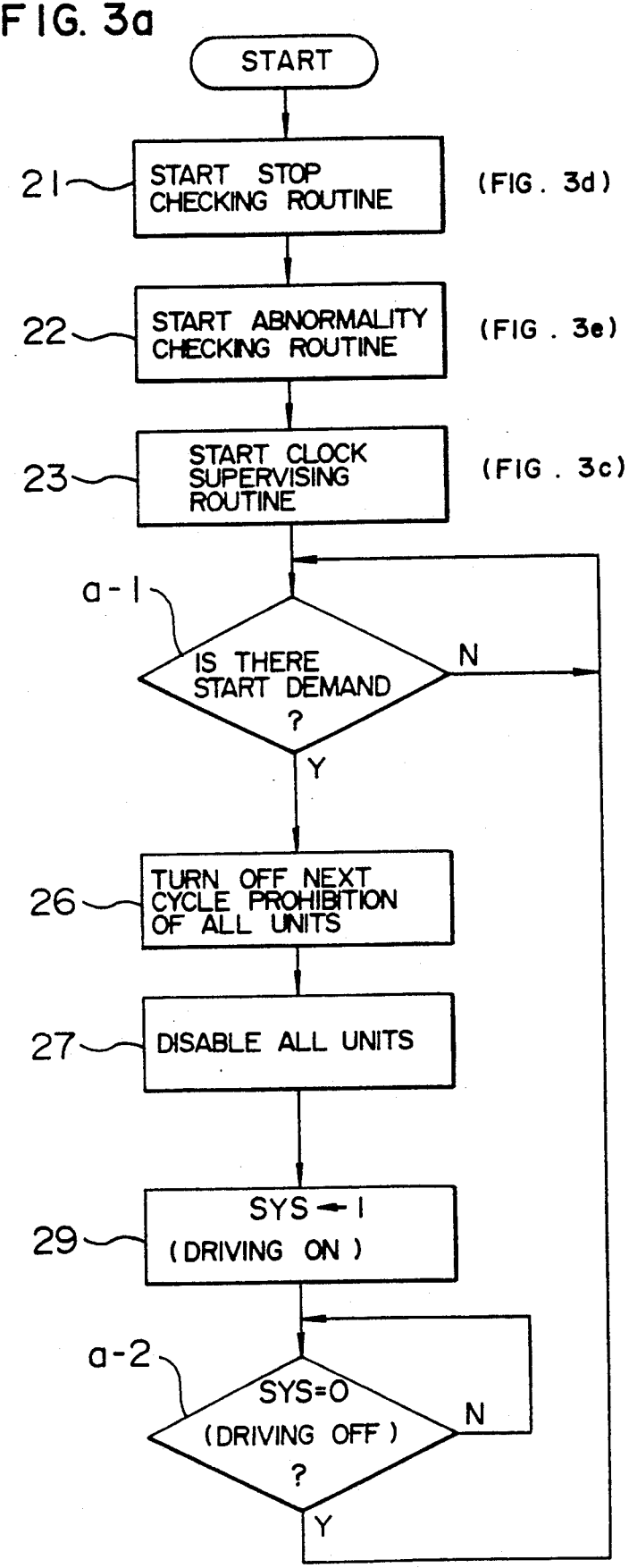
FIG. 3a is a flowchart of a process of a system control section shown in FIG. 2.
Figure 3H:
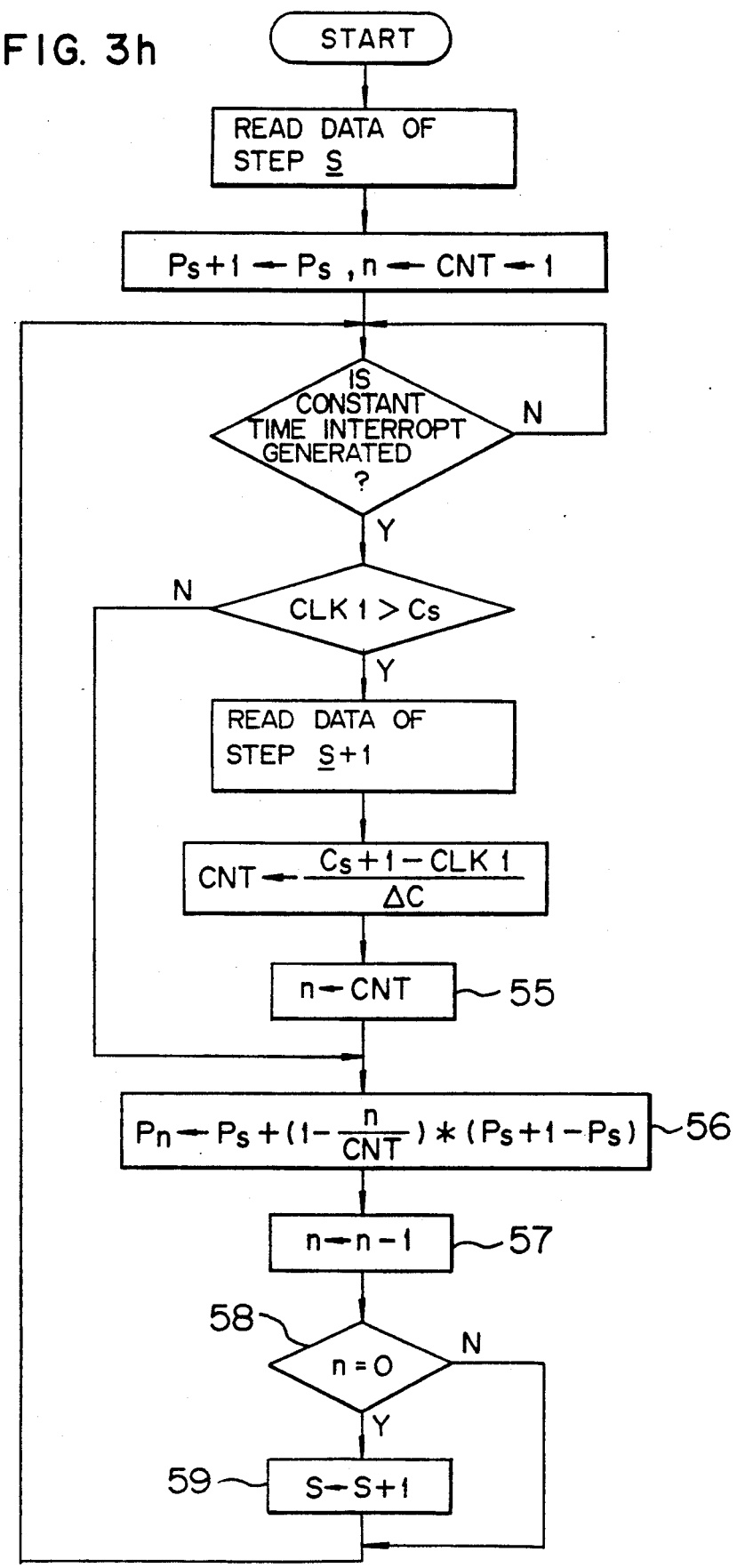
FIG. 3h is a flowchart of a process of a robot command position calculating section shown in FIG. 2.

The operation of the system control section A-1 is carried out in accordance with the flowchart shown in FIG. 3a. The system control section A-1 drives or starts stop checking routine 21, an abnormal condition checking routine 22 and a clock supervising routine 23 after its own start. After that, the respective routines 21, 22 and 23 repeat their processings whenever an interrupt is generated from the constant time interrupt generating section A-4. Subsequently, the system control section A-1 checks in step a-1 whether or not there is the start demand of the system; when the start is demanded, turns off a next cycle prohibition of all the units (i.e., robots 1, 2 and 3 and working unit 4) in step 26; and further disables all the units (operation stopping condition) in step 27. Subsequently, a system driving flag (SYS) is set to "1" (driving on) in step 29, thus completing the process for the start demand. After that, until the flag SYS is "0" (driving OFF), the process is looped in block a-2. At the time when the flag SYS is "0", the process is again in the start demand waiting mode in step a-1.

The operation of the system clock counting section A-3 shown in FIG. 2 is carried out in accordance with the flowchart shown in FIG. 3b. The system clock counting section A-3 also repeats it process whenever the interrupt is generated from the constant time interrupt generating section A-4. The clock counting section A 3 checks whether the constant time interrupt is generated or not (step 30), and whether the system is driven or not (step b-1). If the system is in "driving ON", a system clock signal (CLK) is increased by an value ΔC in step 31, and is again returned to zero in steps b-2 and b-3 when the signal has reached the saturated value. The increment value ΔC is determined by the formula: ΔC = A×ST/CYT where ST is the constant interrupt generation cycle, CYT is a cycle time of the system and A is the saturation value of each clock signal.

TABLE 1

|  | ORIGINAL CLOCK VALUE | SUCTION ON SWITCH VALUE | SUCTION OFF CLOCK VALUE | MACHINING CLOCK VALUE | UPSTREAM UNITS | DOWNSTREAM UNITS | UPSTREAM CLOCK UNITS | WORK TRANSFER METHOD | UNIT NOS. |
|---|---|---|---|---|---|---|---|---|---|
| ROBOT 1 | 1800 | 2000 | 600 | (3300) | *WORK SUPPLY UNIT | WORKING MACHINE | SYSTEM CLOCK UNIT | 0 | 1 |
| WORKING MACHINE | 0 | — | — | 2000 | ROBOT 1 | ROBOT 2 | ROBOT 1 CLOCK UNIT | 2 | 2 |
| ROBOT 2 | 2000 | 3500 | 1300 | (400) | WORKING MACHINE | ROBOT 3 | WORKING CLOCK UNIT | 1 | 3 |
| ROBOT 3 | 700 | 800 | 3000 | (1900) | ROBOT 2 | *WORK RECEIVING UNIT | ROBOT 2 CLOCK UNIT | 0 | 4 |

(saturation value = 4000)
Note 1: mark * represents a unit imaginarily set.
Note 2: The number written in the column of the work transfer method represents the operation as follows.
"0" represents transferring the work to an associated unit under no condition;
"1" represents transferring and receiving the work in synchronism with the associated unit; and
"2" represents that the work is picked up by the associated unit under no condition.

Subsequently, the foregoing clock supervising routine 23 (FIG. 3a) will be explained. The clock supervising routine 23 is carried out in accordance with the flowchart shown in FIG. 3c-(1) to FIG. 3c-(3). The process is carried out whenever the constant time interrupt is generated in step 231. A part c-1 in FIG. 3c-(1) represents a processing part for enabling the first robot 1 (in the operative condition). First of all, it is checked whether or not the signal value of the clock unit (system clock unit) upstream of the robot 1 is identical with the original point clock value of the robot 1 in step c-10. If not, the process is ended. Namely, the robot 1 is not enabled.

If the signal is identical with the original point clock value, the robot 1 is once disabled under no condition (in step 234). Subsequently, the robot 1 checks whether or not the next cycle stop or prehibition is turned off (in step 236). If this is turned on, the robot is not operative and the process is terminated.

Thus, it is possible to disable the robot 1 at the original point if the next cycle prohibition is effected. Subsequently, the robot 1 is enabled in step c-11 under the condition that the upstream unit has the machined work and is enabled (processing part c-5). Incidentally, although the robot 1 is the most upstream unit, in this case, the destack feeder 5 is regarded as the upstream unit of the robot 1. If the work existence signal is ON from the destack feeder, it is regarded that the machined work is present in the upstream unit. If the destack feeder is in the condition of the driving signal ON, the upstream unit is regarded as being enabled. The process c-1 shown in FIG. 3-(1) is similarly applied to the robot 2, the robot 3 and the working machine 4 (steps 238, 239 and c-9). Thus, it is possible to realize the enabling of the units in accordance with the absence/presence of the upstream work at the time when the signal of the clock unit upstream of each unit is identical with the original clock value of the unit itself, and it is possible to synchronize each downstream unit with the upstream unit. Subsequently, the clock supervising routine 23 checks, in a process part c-8 of FIG. 3-(2), whether or not the signal of the clock unit of the robot 1 is identical with the original point clock value of the robot 1 (step 245) and sets the original flag (step 246) which indicates whether the robot 1 is at the original point or not. Subsequently, the process similar to the process part c-8 is applied to the robots 2 and 3 and the working machine 4 (in steps 240, 241 and 242). Subsequently, the clock supervising routine 23 performs the process for synchronous control between the clock signal and the working machine in a process part c-7 of FIG. 3c-(3). In this process part, the increment value $\Delta C$ of the system clock signal is increased or decreased relative to the working machine controlled independently of the control unit of the robots for the purpose of the synchronism of the system clock signal with the working machine. If the working machine is enabled, $\Delta CD$ = (working machine detected position) − (working machine clock signal) is determined as a difference between the detected position of the working machine and the clock signal of the working machine in step 243.

If the value $\Delta CD$ is zero, it is judged that the working machine position and the machine clock signal are identical with each other in synchronism, thus completing the process. If $\Delta CD$ is larger or less tan zero, the $\Delta C$ is increased/decreased in accordance with the following formula (step 244):

$$\Delta C = \Delta C + \Delta CD \cdot a$$

where a is a constant determined in advance.

Thus, if the clock signal of the working machine is delayed relative to the detected position of the working machine, $\Delta C$ can be increased, whereas if the clock signal is advanced relative to the detected position, $\Delta C$ can be decreased. It is possible to advance/retard the system clock signal in accordance with the flowchart of the system clock counting part of FIG. 3b, thus realizing the synchronism with the working machine.

Subsequently, the clock supervising routine 23 checks in a process part c-10 whether or not the deviation $\Delta CD$ between the detected position of the working machine and the machine clock signal meets the following relationship:

$$|\Delta CD| > \text{deviation allowance range.}$$

If $|\Delta CD|$ exceeds the allowable range, it is judged that there is an abnormality in synchronism. Thus, it is possible to prevent undesired interference in advance by judging the synchronous abnormality even if the deviation in synchronism due to some abnormality in the clock signal, which is normally synchronous with the working machine, would be generated. The clock supervising routine 23 of the clock supervising section A-2 has been described above.

Subsequently, the stop checking routine 21 shown in FIG. 3a will be explained. The stop check routine 21 is carried out in accordance with the flowchart shown in FIG. 3d. The process is performed whenever the constant time interrupt is generated (step 210). The stop checking routine 21 checks the presence/absence of the system stop demand first of all (step 211). If there is the demand, the next cycle prohibition of the most upstream unit (corresponding to robot 1 of the present system) is turned on (step 212). Subsequently, in a process part d-1 of FIG. 3d, if the robot 1 is disabled, the next cycle prohibition is turned on for the unit downstream of the robot 1 as the process for transmitting the stop of the robot 1 to the unit downstream of the robot 1. In the system, if the robot 1 is disabled and the next cycle prohibition of the robot 1 is turned on, the next cycle probihition of the unit downstream of the robot 1 is turned on (step 214). Subsequently, the process similar to the process part d-1 is applied to the robots 2 and 3 and the working machine 4 (steps 215, 216 and d-2). Accordingly, if the upstream unit is disabled at the original point in accordance with the ON signal of the next cycle prohibition, the next cycle prohibition is transmitted to the downstream units, so that each unit may be stopped at the original point thereof. Subsequently, the stop checking routine 21 checks whether or not all the units are disabled (steps 217, 217′, 217″ and 218). If so, the drive flag (SYS) is set to "0" (driving OFF) in step 219, thus terminating the process. The stop checking routine has been described above.

The abnormality checking routine 22 shown in FIG. 3a will be explained. The abnormality checking routine 22 is carried out in accordance with the flowchart shown in FIGS. 3e(1) and 3e(2). The process is performed whenever the constant time interrupt is generated (step 220). A part e-1 of FIG. 3e(1) represents the abnormality processing part of the robot 1. First of all, the absence/presence of the abnormality of the robot 1 is checked. If there is the abnormality, the robot 1 is disabled (the operation is prohibited and the robot is stopped as it is). Subsequently, if there is the upstream unit, it is checked whether or not the upstream robot is kept in a safety operational range (step 222). If the unit is out of the safety operational range, the upstream unit is disabled and stopped. The safety operational referred above means a range of position of each unit, in which if the upstream or downstream unit is stopped due to the abnormality, and even if the robot continues the operation, there is no fear that the robot would interfere with the upstream or downstream stopped unit. The safety operational range is taught in advance within the range of the corresponding clock signal values. For this reason, even if the stop command due to the abnormality of the upstream or downstream unit is effected, if the clock signal of the robot is in the range of the safety operational range, the robot continues its operation, so that the present operational cycle may be continued up to the original point. If the clock signal is out of the safety range, the robot is stopped as it is. Thus, since each unit continues its operation and stops at the original point thereof as far as there is no risk of interference, it is possible to avoid the unnecessary stop on the spot and to obviate the job for returning the unit to the original point due to the midway stop. According to the thus described means, each unit is judged whether it is to stop on the spot or continue operating.

Subsequently, the abnormality checking routine 22 checks whether or not there is any further upstream unit (step 223). If any, the process is returned back to the step 222, and the like process is carried out. If there is no upstream unit, the next cycle prohibition is turned on for all the upstream units (step 224). Thus, if the abnormality occurs in the robot 1, the abnormality is transmitted to the units upstream the robot 1 one after another so that each unit is stopped on the spot or is disabled at its original point by the next cycle prohibition to be stopped there.

Subsequently, the abnormality checking routine 22 checks whether or nor there is any unit downstream the robot 1. If there is the downstream unit, the routine 22 checks whether or not the downstream unit is in its safety operational range (step 225). If the unit is out of the safety operational range, the downstream unit is disabled to be stopped at its present position. Further, the routine 22 checks whether or not there is any further downstream unit (step 226). If any, the same process is carried out in step 225. If the unit is in its safety operational range in the step 225, the next cycle prohibition of the downstream unit is turned on, thus terminating the process. With such a routine, if the abnormality occurs in the robot 1, the abnormality is transmitted to the downstream units one after another. If each unit is out of the safety operational range, the unit is stopped at its present position. If not, the operation thereof is continued up to its original point with the next cycle prohibition turned on. Since the next cycle prohibition is transmitted to the further downstream units by the process part d-1 of the stop checking routine, the downstream units are stopped one after another at the respective original points.

The thus described is the abnormality processing on the robot 1. The like process is applied to the robot 2, the robot 3 and the working machine. This is the abnormality checking routine.

Explanation will be made referring again to the system block diagram of FIG. 2. In the system block 2-A, by performing the foregoing routines, it is possible to check the absence/presence of the upstream work and to check whether or not the subject unit is at the original point, to thereby judge whether or not each unit may be enabled. Also, it is possible to check whether or not any upstream unit, the subject unit itself or any downstream unit is stopped, whether or not any abnormality is generated, and whether or not any interference is present, thus judging whether or not the units should be disabled.

The block 2-B of the robot 1 shown in FIG. 2 will be explained. The block 2-B of the robot 1 is composed of a robot 1 control section B-1, a robot 1 operational condition registering section B-2, a robot 1 clock counting section B-3, a robot 1 availability/unavailability selecting section B-4, a robot 1 command position calculating section B-5, a robot 1 position date recording section B-6, and a robot 1 servo amplifying section B-7.

The process of each section will be explained below. First of all, the process of the robot 1 controlling section B-1 is carried out in accordance with the flowchart shown in FIGS. 3f(1) and 3f(2). In this section, it is checked whether or not the robot 1 is enabled (step 260). When the robot 1 is enabled, the following steps are effected. If the robot 1 is enabled, the command position of the robot 1 is calculated in accordance with the present value of the clock signal of the robot 1 (step 261). The command position signal is outputted to the servo amplifying section B-7 of the robot 1 (step 262). Subsequently, the process for turning on the work suction is carried out in a processing part f-1. First of all, it is checked whether or not the clock value of the robot 1 is equivalent to the clock value of the work suction ON (step 263). If this is the case, it is checked whether or not an upstream unit, that should be an associated unit for providing the work, is enabled (step 264) or whether the work transferring mode of the upstream unit is "2" (the work is to be picked up by the associated unit) (step 265). At the same time, if the upstream unit holds the work (step 267), the work suction signal of the robot 1 is turned on (step 268), and simultaneously therewith, the work existence signal of the robot 1 is turned on (step 269).

Subsequently, in a processing part f-2, the process for switching the work presently held by the robot 1 from the unmachined work to the machined work. Although, in this system, the robot only conduct the conveyance and the robot itself does not conduct the machining, this processing part is provided for assuming that the robot itself perform the machining work. For this reason, the phantom step is interposed between the step for turning on the suction of the robot 1 and the step for turning off the suction thereof. This phantom step is regarded as a work machining step. The process is passed through this phantom step, thus switching over the robot 1 from the unmachined work to the machined work. Subsequently, in a processing part f-3, the process for turning off the work suction of the robot 1 is performed. In this part, it is checked whether the clock signal of the robot 1 is equivalent to the clock value of the work suction OFF (step 275). If this is the case, it is checked whether the downstream unit which is an associated unit for receiving the work is enabled or not (step 276), or whether the work transferring mode of the robot 1 is "0" or not (step 279). On the other hand, if the work is not present (step 279), the suction signal of the robot 1 is trend off (step 280) and at the same time, the work existence signal of the robot 1 is turned off (step 280'). The foregoing process is the robot 1 operating routine of the robot 1 controlling section.

Subsequently, the operational condition registering section B-2 will be described. A variety of conditions needed for the operation, such as the clock value of the original point of the robot 1, the suction-on step and the suction-off step as listed in Table 1 are registered by the maneuver of a teaching controller.

Subsequently, the operation of the robot 1 clock counting section B-3 will be described. The process of the robot 1 clock counting section is carried out in accordance with the flowchart shown in FIG. 3g. It is checked whether the robot 1 is enabled or not whenever the constant time interrupt is generated (step 40). Only when the robot 1 is enabled, a value of a system clock signal (CLK) is set to the robot 1 clock unit (CLK1) without any modification (step 42). Similar process is performed in each of the other units. When all the units are enabled to be operative, the clock units of all the units have the same value as that of the system clock signal. In this case, all the units are controlled in accordance with the same clock signal.

Subsequently, the operation of the robot 1 availability/unavailability selecting section B-4 will be explained with reference to FIG. 4. In the robot 1 availability/unavailability selecting section B-4, the availability (operative) or the unavailability (inoperative) of the robot 1 for the start of the operation is selected by the maneuver of the teaching controller 6.

Figure 4:
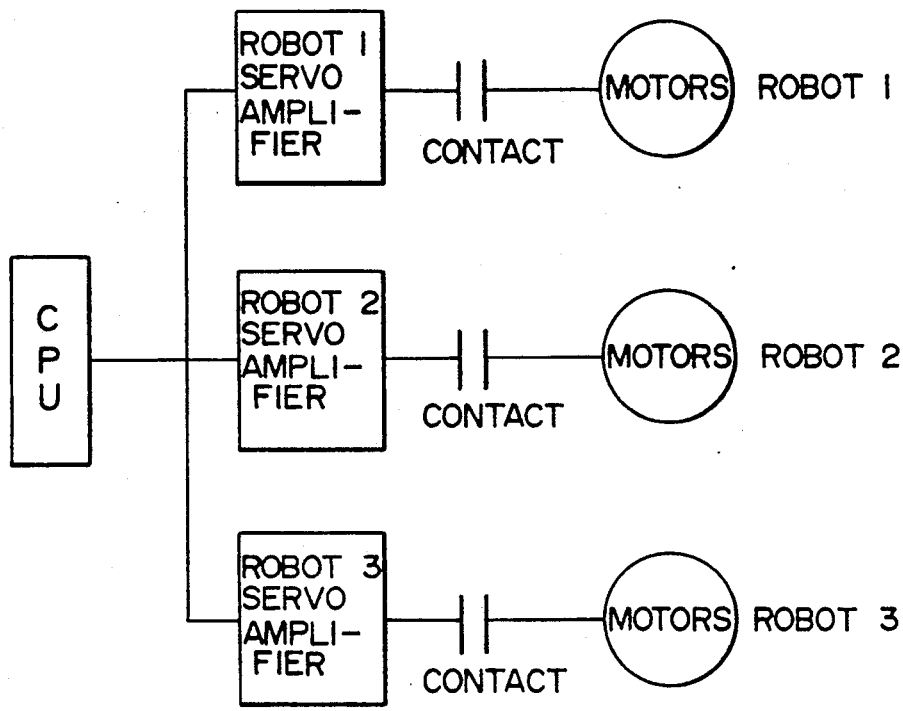
FIG. 4 is a schematic view for illustrating an operation of a robot availability/unavailability selecting section shown in FIG. 2.

By the selection of the availability, a contact for the robot selected in FIG. 4 is closed, so that a power is supplied from the servo amplifier unit. In the case of the unavailability, since the contact is opened, the power will not be supplied. Thus, the robot which has been selected as the available one, the power is supplied thereto, so that the robot is in the condition capable of operating or being manually manipulated. On the other hand, if the robot is selected to be the unavailable one, no power is supplied thereto. Accordingly, there is no fear that an accident would occur due to any unexpected or accidental operation of the robot during the operator's maneuver for teaching. Also, since an unnecessary power is not supplied to the robot, it is possible to effectively save the energy.

The operation of the robot 1 command position calculating section B-5 will be explained. In the robot 1 command position calculating section B-5, the command position is calculated in accordance with the flowchart of the command value calculating routine shown in FIG. 3h. In this section, the command position corresponding to the present clock value is calculated in accordance with a present value of the clock signal, a clock value of the present step, a position of the robot, a clock value of the next step, and a robot position of the next step. The calculation method will be explained assuming the respective parameters as follows:

clock signal increment interval: t (seconds) ... identical with the constant time interrupt generating cycle clock signal increment value: ΔC (/one time or /t seconds)

clock value of the present step S: Cs
position of the present step S: Ps
clock value of the next step S+1: Cs+1
position of the next step S+1: Ps+1

Also, assuming that the processing time period per one loop of the controlling section operational routine B-1 of the robot 1 shown in FIG. 3f is within CT seconds at maximum, the definition is made so that the command position calculation may be performed at one time/CT seconds. However, there is a relationship of t≦CT. The following description will be made on the assumption that there is the relationship of t = CT, that is, the clock signal increment interval is equal to the command value calculation interval.

The increment number CNT1 of the clock signal during the movement from the present position to the point $P_{s+1}$ is given by the following expression:

$$CNT1 = \frac{C_{s+1} - CLK1}{\Delta C}$$

where CLK1 is the value of the clock signal of the robot 1.

The clock signal increment number CNT2 within the command value calculation interval is given as follows:

$$CNT2 = \frac{CT}{t} = 1.$$

Therefore, the command value counting number CNT during the movement from the present position to the point $P_{s+1}$ is given as follows:

$$CNT = \frac{CNT1}{CNT2} = \frac{\frac{C_{s+1} - CLK1}{\Delta C}}{\frac{CT}{t}} = \frac{(C_{s+1} - CLK1) \cdot t}{\Delta C \cdot CT}$$

$$= \frac{C_{s+1} -}{\Delta C}.$$

The m-th time command value calculation formula during the movement from the present position to the point $P_{s+1}$ is given as follows:

$$Pn = Ps + \left(1 - \frac{n}{CNT}\right) \cdot (P_{s+1} - Ps)$$

where n = CNT − m: m = 0, 1, 2, ..., CNT.

Figure 5:
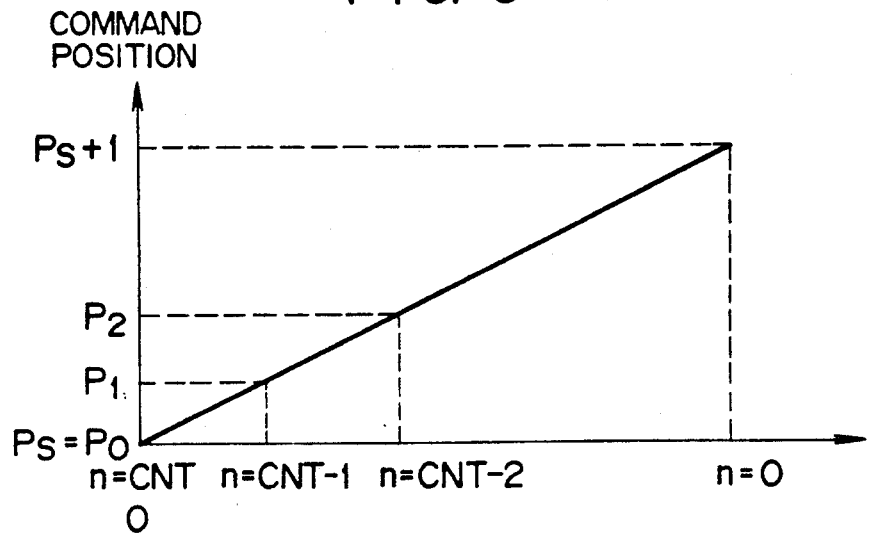
FIG. 5 is a diagram showing a relationship between a command position and a calculation number according to the flowchart shown in FIG. 3h.

In the 0-th calculation of the command value, the calculation is performed under the condition of n = CNT, and in the first calculation, the calculation is performed based upon the value obtained by subtracting "1" from n, i.e., CNT−1. Thereafter, Pn obtained by subtracting "1" from n in order is outputted as the command value, and the command value reaches Ps under the condition of n = 0. The clock value Cs of the step S+1 and CLK 1 must be identical with each other at n = 0. This is the correct synchronized condition between the clock signal and the position. If the value of CLK 1 is advanced beyond Cs+1, the calculation number CNT is decreased to revert the synchronism. In the flowchart shown in FIG. 3h, when the process is started, after the above-described data have been read out, n = CNT is set in step 55, and the command value Pn is calculated and outputted in the step 56. Subsequently, n is subtracted by "1" step 57, and it is judged whether or not n = 0 in the step 58. Unless n = 0, the process is continued as it is, whereas in the case of n = 0, in the step 59, the step S+1 is regarded as the present step S to continue the process. FIG. 5 is a graph illustrating the relationship between the above-described command position and the calculation number.

Figure 6:
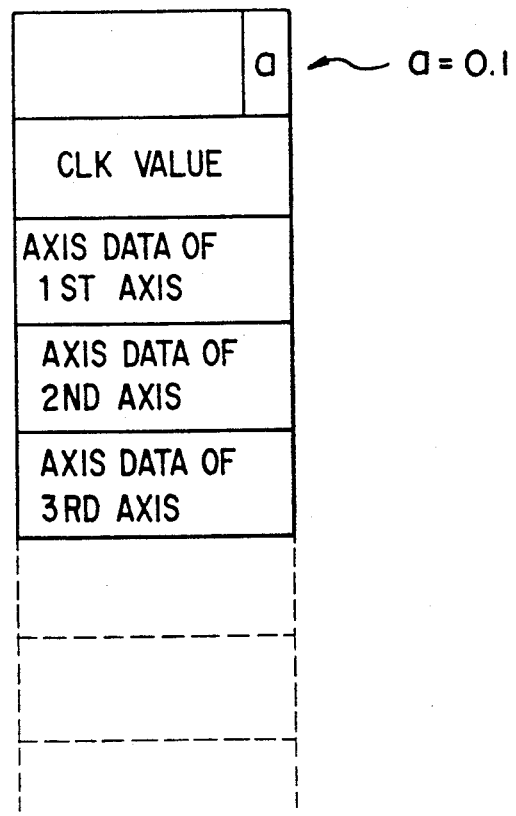
FIG. 6 is a diagram illustrating an operation of a robot 1 position data recording section shown in FIG. 2.

Subsequently, the operation of the robot 1 position data recording section B-6 will be explained. In this section, positional data of each axis of the robot 1 and clock signals corresponding thereto are recorded by the maneuver of the teaching controller 6 as shown in FIG. 6. An a-part of FIG. 6 records "0" or "1"The step recorded as "1" means the original point step, and the clock value and the axis data of this step are dealt with as the original point clock value and the original position, respectively. These data are read out whenever the command position calculation is effected in the robot 1 command position calculating section B-5.

Subsequently, the operation of the robot 1 servo amplifier section B-7 will be described. In this section, the command position data calculated in the robot 1 command position calculating section B-5 are received and the servo amplifier is driven in accordance with the data to thereby operate the respective motors of the robot 1. The respective process contents of the robot 1 block 2-B is described above. The same process is applied also to the robot 2 and the robot 3.

Subsequently, the operation of the working machine block 2-C will be described. The working machine block 2-C is composed of a working machine controlling section C-1, a working machine operating condition registering section C-2, a working machine clock detecting section C-3, and a working machine availability/unavailability selecting section C-4. First of all, the operation of the working machine controlling section C-1 will be explained. The process of the working machine controlling section C-1 is carried out by the flowchart shown in FIG. 3i. In this section, first, it is checked whether the machine is available or not (step 60). If the machine is available, the working machine original point clock value GCLK is set to the working machine start-on clock value MON. Subsequently, it is checked whether the working machine is enabled or not (step 61). If the machine is enabled, it is checked whether or not the machine clock signal is identical with the machine start-on clock value MON (step 62). If identical, the machine start signal is turned ON, to thereby drive the working machine. If not, the machine start signal is turned OFF.

Subsequently, the operation of the working machine operational condition registering section C-2 will be explained. In the working machine operational condition registering section C-2, a variety of conditions needed for operations such as the machine original point clock value or the like shown in FIG. 1 is registered by the maneuver of the teaching controller. Subsequently, the working machine clock detecting section C-3 will be explained. In this section, the data are read out from the means (e.g., an encoder) for detecting the position of the working machine, not shown, mounted on the working machine. The data are handled as a clock value representative of the present position of the working machine. Subsequently, the operation of the working machine availability/unavailability selecting section C-4 will be described. In this section, the availability/unavailability of the machine may be selected by the maneuver from the teaching controller 6. The process of the working machine block has been described above. Thus, the explanation of the control block diagram of the system shown in FIG. 2 has been completed.

Figure 7:
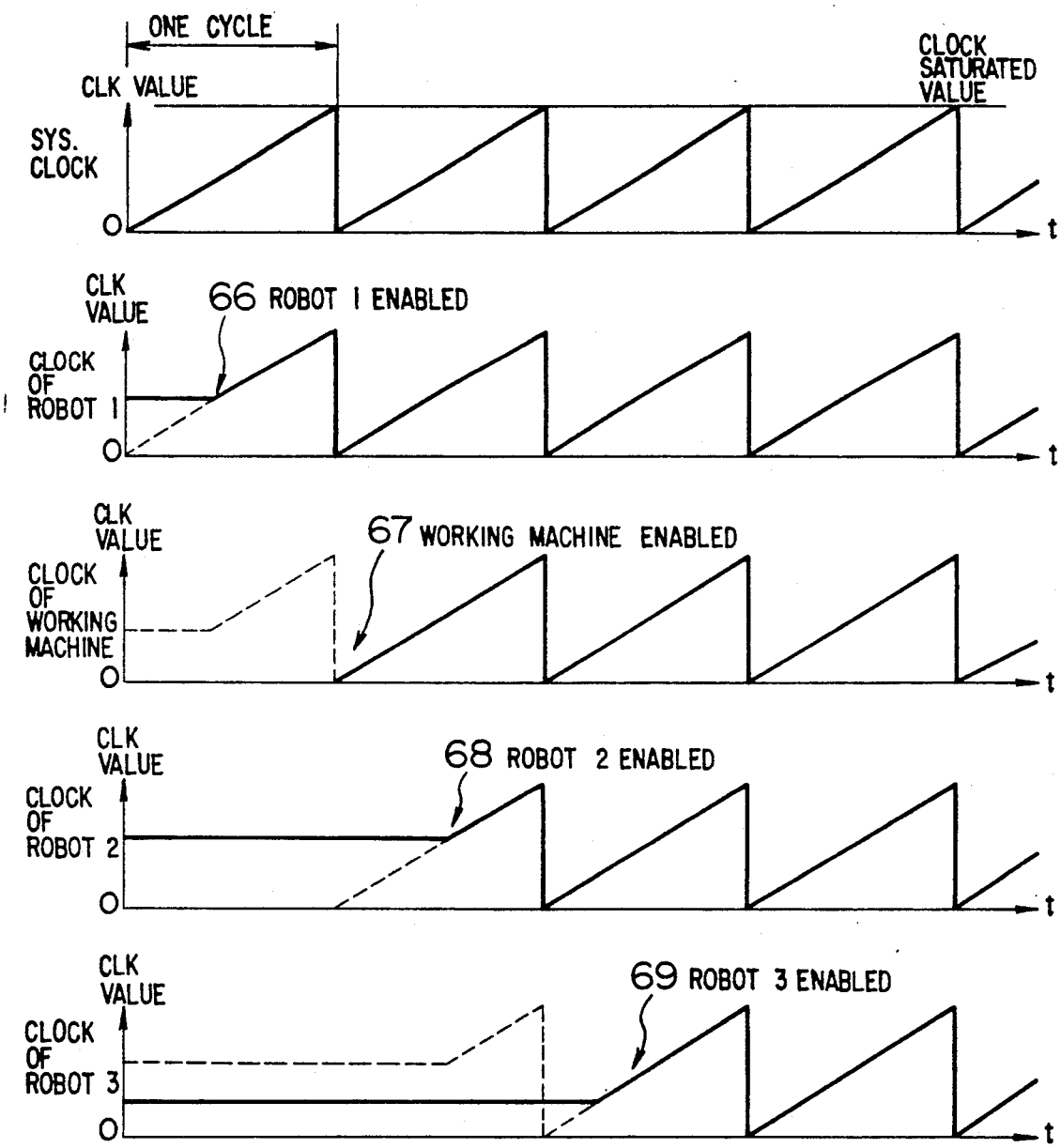
FIG. 7 is a timechart showing a clock cycle of the robot system shown in FIG. 1 when the system is demanded to drive.
Figure 8:
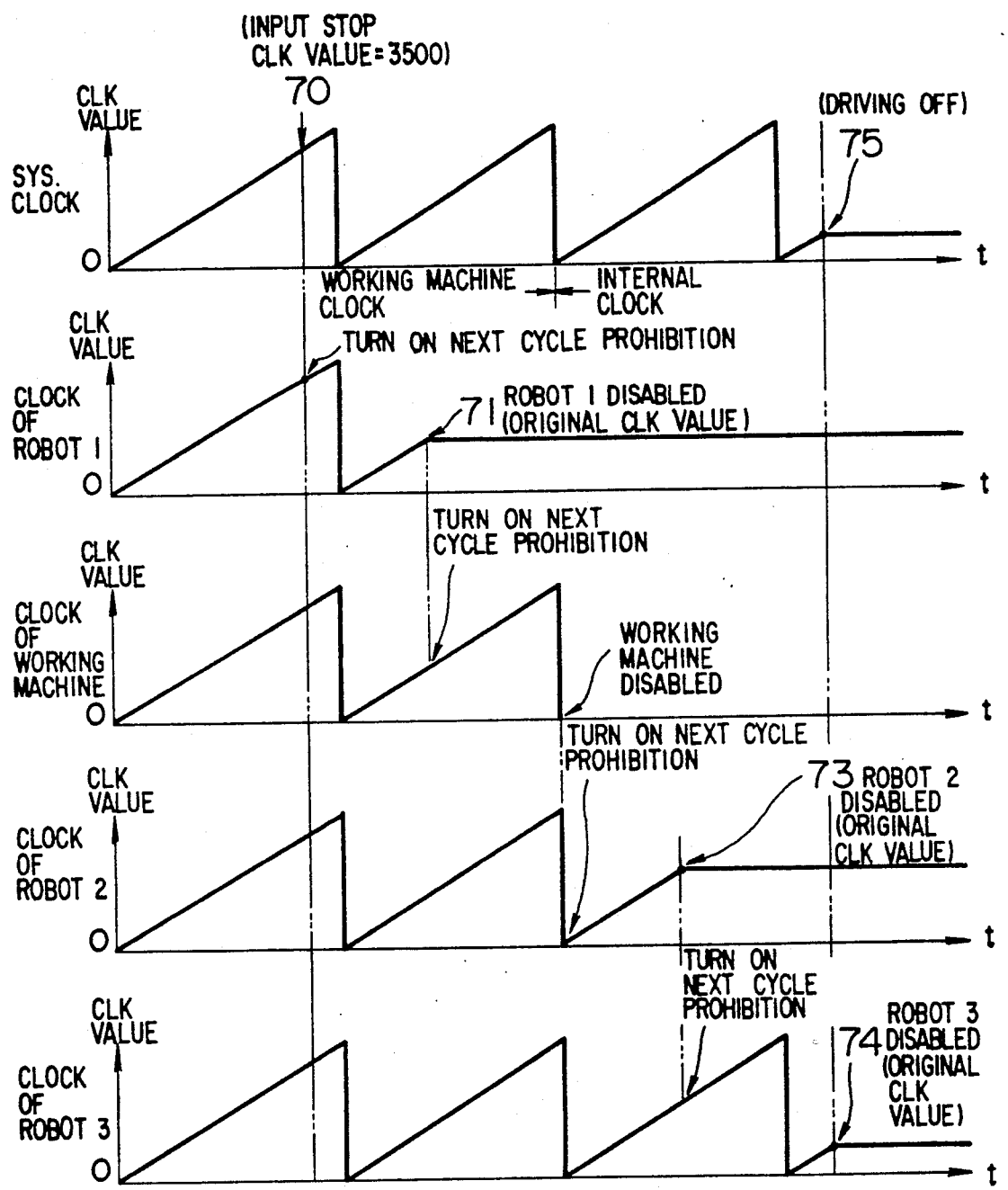
FIG. 8 is a timechart, similar to FIG. 7, showing a clock cycle upon the system stop demand.

FIG. 7 shows a summary process of the above-described processes upon the demand of the system start. FIG. 8 shows a summary process of the above-described processes upon the demand of the stop of the system. FIGS. 7 and 8 are based upon the set conditions of Table 1. Explanation will be made referring now to FIG. 7. Assume that all the units are located at the respective original points and the system start demand is generated at t=0, the system clock starts counting from t=0 as an internal clock unit of the control unit. If in the first cycle of the system clock count, the system clock signal is identical with the robot 1 original point clock value, and if the work is supplied from the work supplying unit, the robot 1 is enabled (in the position indicated by numeral 66 in FIG. 7), so that the robot 1 clock starts counting. Thereafter, when the robot 1 clock signal enters the second cycle, the signal comes to be identical with the working machine original point clock value. If the robot 1 holds the work, the machine is enabled (in a position 67). At the same time, since the signal is identical with the working machine start-on clock value, the working machine start signal is turned ON, thereby driving the working machine so that the working machine clock starts counting.

Thereafter, the machine clock is counted up. When its signal comes to be identical with the robot 2 original point clock value, and when the machine holds the machined work, the robot 2 is enabled (at a position 68 in FIG. 7), and the robot 2 clock starts counting. Thereafter, the robot 2 clock is counted up. When its signal comes to be identical with the robot 3 original point clock value, and when the robot 2 holds the work, the robot 3 is enabled (at a position 69), so that the robot 3 clock starts counting. As described above, if the clock signal of the upstream unit comes to be identical with the original clock value of the subject unit, the subject unit is enabled, which condition is transferred to the downstream unit, whereby it is possible to operate all the units in synchronism. Explanation will be made referring to FIG. 8. It is assumed that, during the condition where all the units are enabled, the system stop demand is issued at the clock value 3500 (a position 70 in FIG. 8). At this time, since the most upstream robot 1 is subjected to the next cycle prohibition-ON at the time when the signal of the robot 1 clock comes to be identical with the next robot 1 original clock value, the robot 1 is disabled (at a position 71). At this time, the working machine downstream of the robot 1 is subjected to the next cycle prohibition. When the working machine clock signal comes to be identical with the next machine original point clock value, the machine is disabled to stop (at a position 72). At the same time, the robot 2 downstream of the working machine is subjected to the next cycle prohibition. At the time when the robot 2 clock signal comes to be identical with the next robot original clock value, the robot 2 is disabled (at a position 73). Simultaneously, the robot 3 downstream of the robot 2 is subjected to the next cycle prohibition. At the time when the signal of the robot 3 clock comes to be identical with the robot 3 original point clock value, the robot 3 is disabled (at a position 74). Thus, in the order from the most upstream side of the system, the units are disabled at the respective original points, so that the units are stopped without remaining the works in the system (at a position 75). The structure and operation of the system according to the embodiment of the first aspect of the invention have been fully explained.

A robotic system according to an embodiment of a second aspect of the invention will be explained.

The overall structure of this embodiment is substantially the same as that of the embodiment of the first aspect of the invention shown in FIG. 1. However, the present embodiment is different in respect of no continuous operation of the working machine from the embodiment according to the first aspect wherein the working machine 4 is continuously operated. This is made for coping with the cases where the operational speed of the working machine 4 is higher than the maximum speed of the robots 1 to 3, or it is impossible to reduce the operational speed of the working machine itself though reduction of the operational speed of the overall system is desired. More specifically, the embodiment of the second aspect is the system where the working machine 4 is synchronized with the robot speed (system speed) by the intermittent operation for stopping the working machine 4 in every cycle and the master unit of the system is the robot 1.

The control block arrangement of the embodiment of the second aspect is substantially the same in structure as that shown in FIG. 2. Only the difference in process in each block will be explained.

Figure 3I:
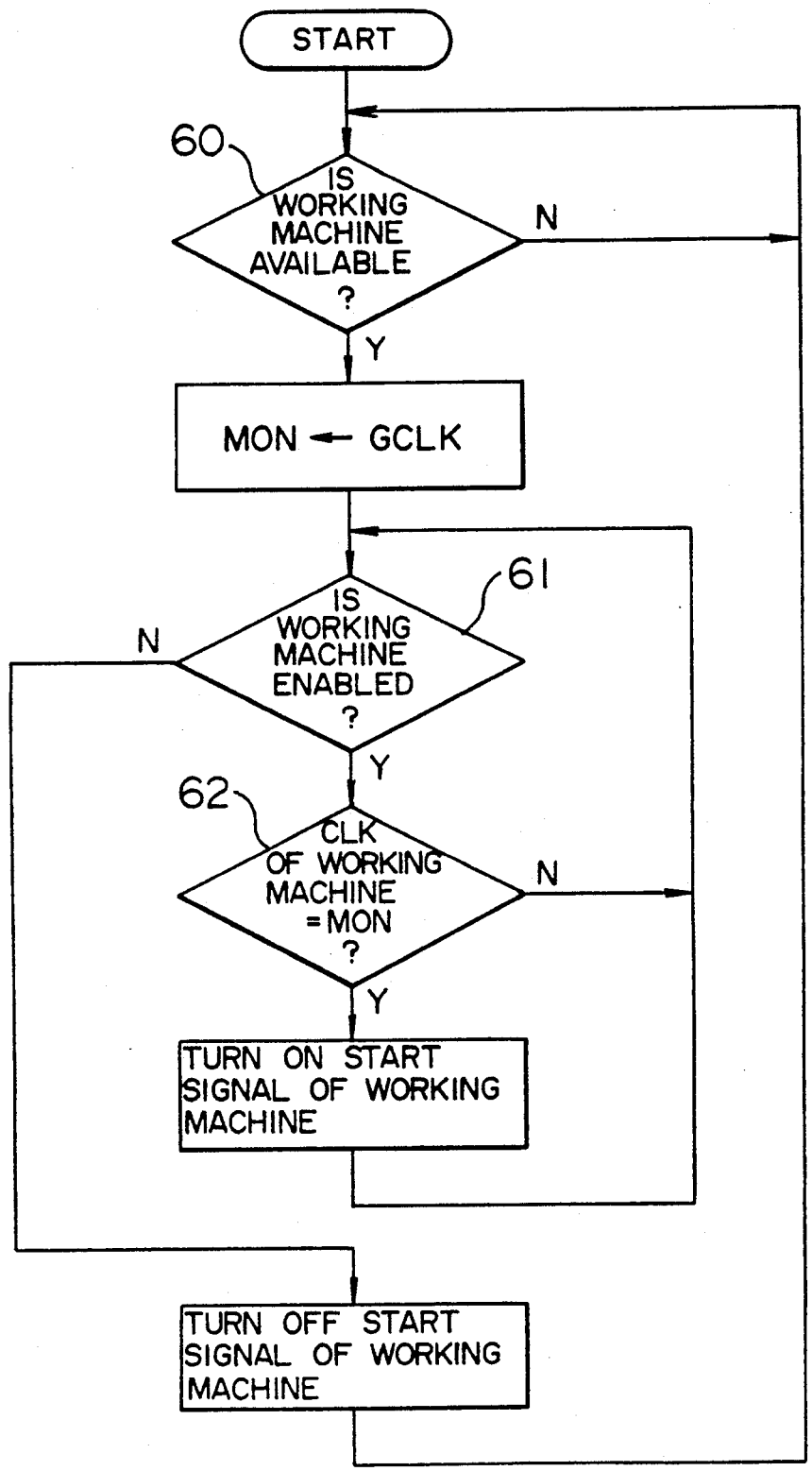
FIG. 3i is a flowchart of a process of a working machine controlling section shown in FIG. 2.
Figure 9A:
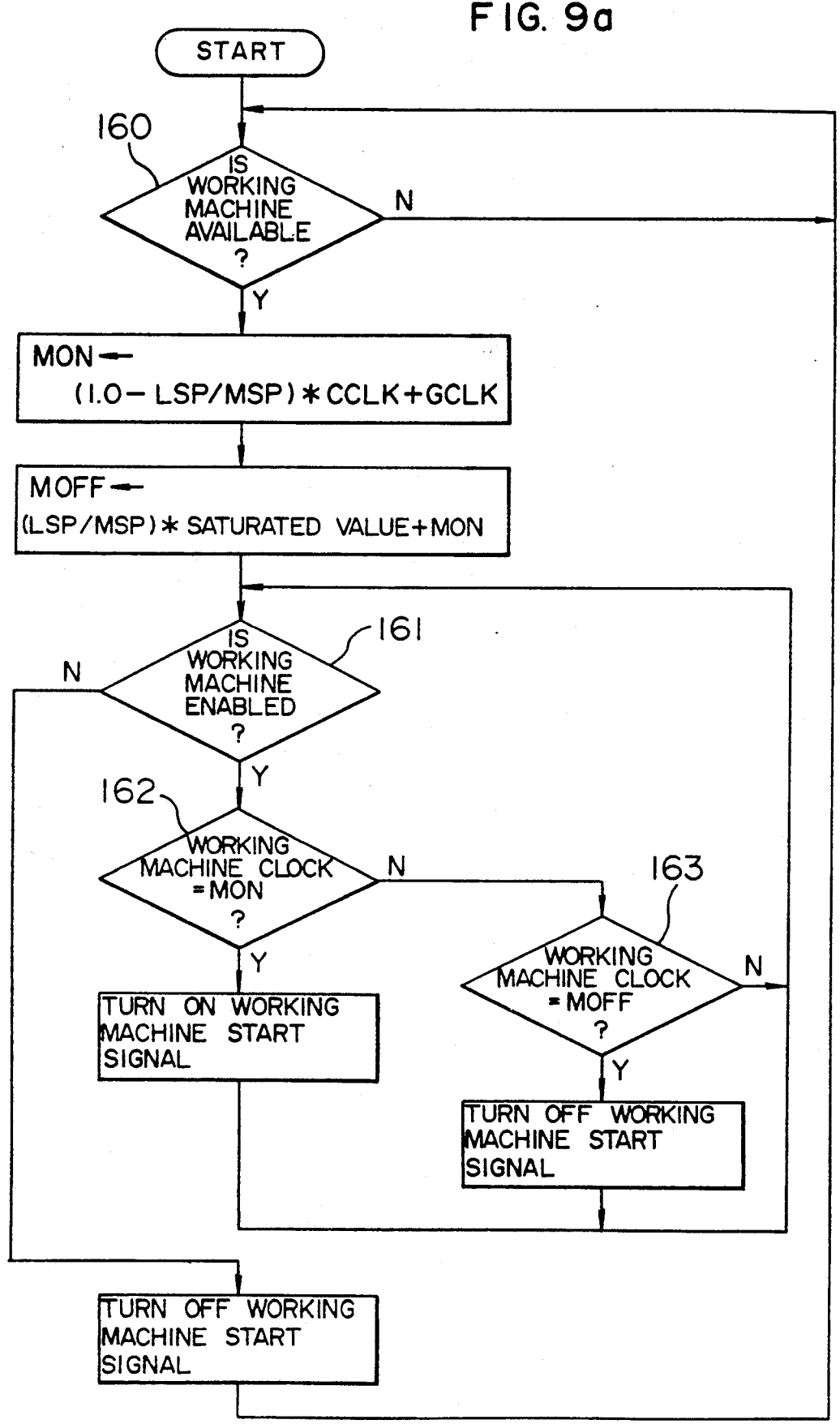
FIG. 9a is a flow chart showing a working machine operating routine in an industrial robot system in accordance with an embodiment of another aspect of the invention.

First of all, the working machine operating routine of this embodiment is different from that shown in FIG. 3i, and is shown in FIG. 9a.

The reason for this is that, when the operational speed of the machine is set at a level higher than the clock speed of the robot as described above and only the machine is intermittently operated, if the working machine is driven at the time corresponding to the original point clock value as in the first embodiment, there is a fear that the advance of the machine would exceed that of the robot to cause undesired interference. Accordingly, as the start timing without any interference, a start-on clock value of the working machine is identical with any position of the working machine is identical with any clock value of the machine clock. And, the working machine is driven in accordance with the clock value without a fear of interference.

The process of FIG. 9a will be described. First of all, the working machine start-on clock value MON is represented by the following formula:

$$MON = (1.0 - LSP/MSP)^* CCLK + GCLK$$

where LSP is the line speed, i.e., the speed of the system clock, MSP is the operational speed of the working machine, GCLK is the original point clock value of the working machine, CCLK is certain timing at which the machine clock signal is made correspond to the position of the working machine, and MOFF is the clock value of the machining drive-off (MON, MOFF, CCLK, and GCLK have any values between 0 to 4000 as their respective clock values, and LSP and MSP are represented in terms of SPM unit (stroke/min.) as speeds).

For instant, it LSP = 10 (SPM), MSP = 20 (SPM), CCLK = 2000, GCLK = 0, the following result is given:

$$MON = (1.0 - 10/20)^* 2000 + 0 = 1000.$$

Namely, if it is desired to make the clock signal correspond to the position of the working machine at the clock value of 2000 with the speed ratio of 1:2, the working machine may be started at the timing when the working machine clock is counted 1000.

Also, the machine drive-off clock value (MOFF) is given by the following formula:

$$MOFF = (LSP/MSP)^*(clock\ saturation\ value) + MON.$$

Figure 9B:
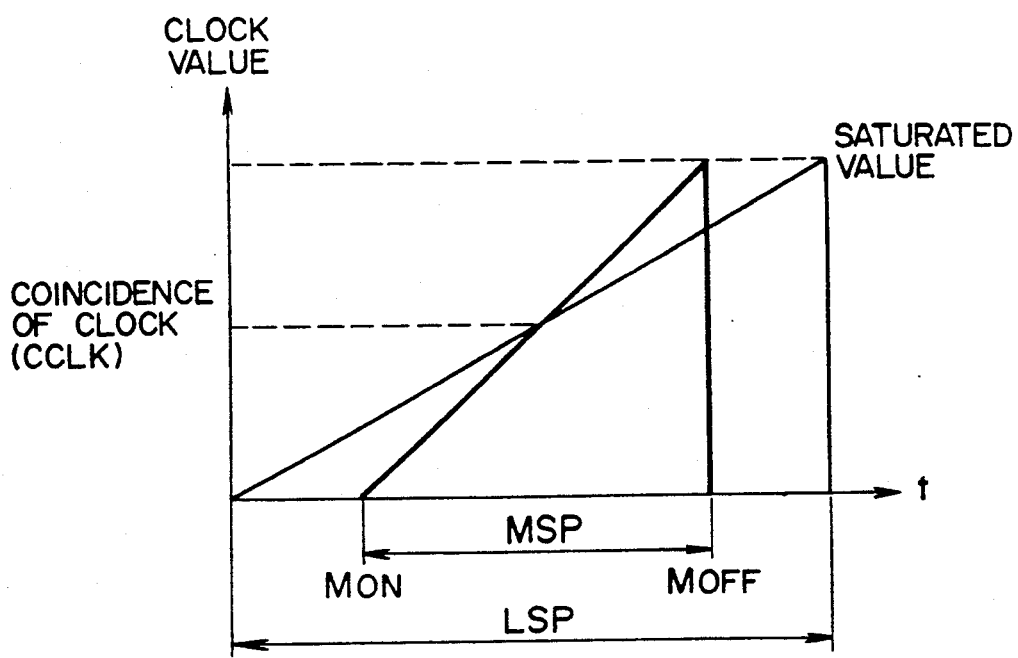

FIG. 9b shows a relationship among the clock signals at this time.

As described above, after the judgment as to whether the working machine is available in step 160 of FIG. 9a, the working machining drive-off clock value and the working machine start-on clock value are determined. Subsequently, it is checked whether or not the working machine is enable (step 61). If enable, it is checked whether or not the working machine clock signal comes to be identical with the working machine start-on clock value (step 62). If identical, the working machine drive signal is turned ON (at 179 of FIG. 10). Also, if the clock signal is identical with the working machine drive-off clock value, the working machine start signal is turned OFF. Thereafter, this process is repeated during the condition that the working machine is enabled, so that the drive of the working machine is intermittently performed.

If the working machine is driven with the clock value meeting the above conditions, there is no interference even if the machine is operated at a higher speed than that of the robots. Thus, it is possible to realize the system like that according to the embodiment of the first aspect.

Figure 10:
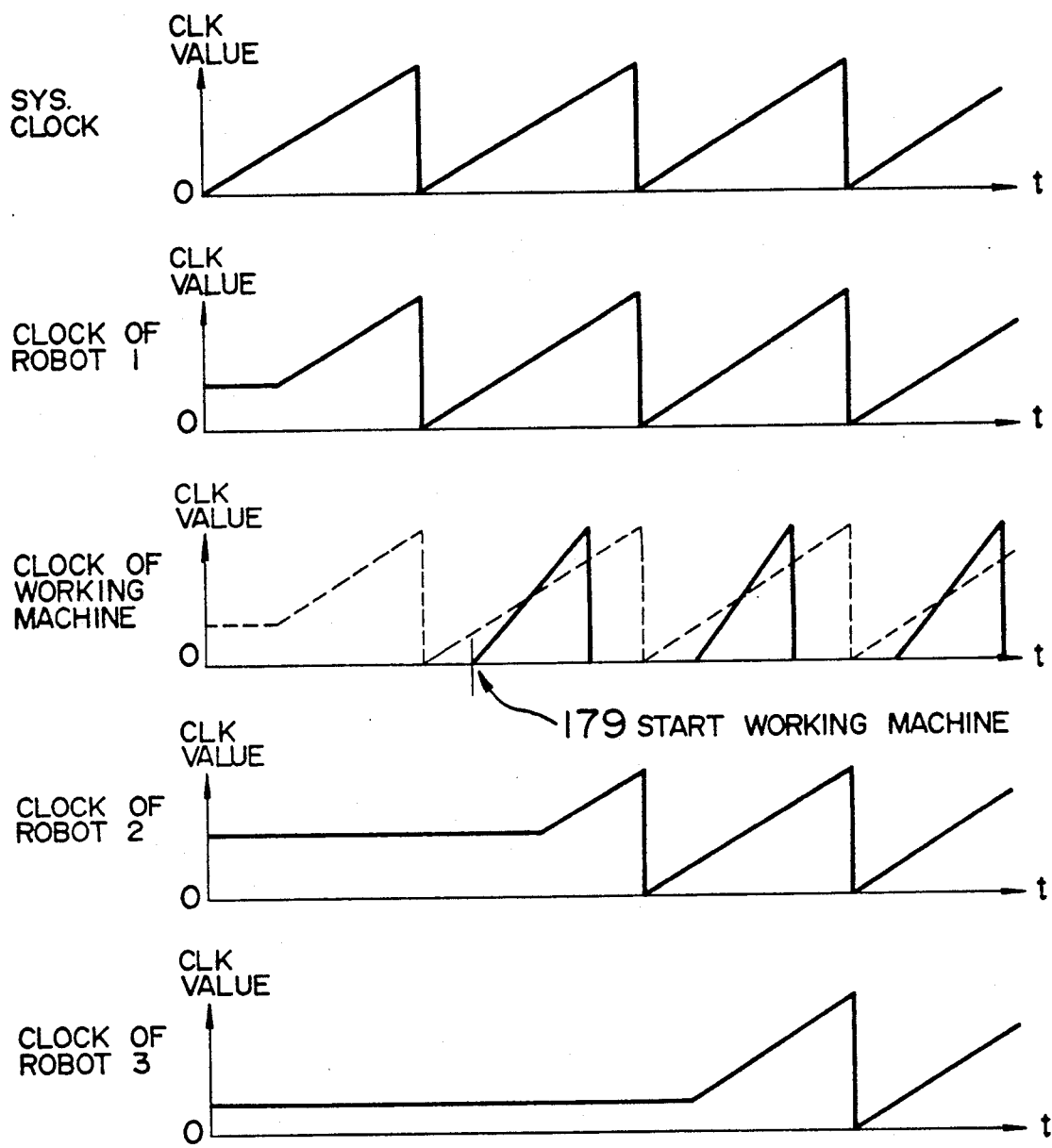
FIG. 10 is a timechart showing a clock cycle, upon the system drive demand, in the system of an embodiment of a second aspect of the invention.

FIG. 10 is a clock cyclic diagram in the case where the system start demand is generated in the embodiment of the second aspect. This diagram is exactly the same as that shown in FIG. 7 except for the portion of the working machine clock. At the time when the robot 1 clock signal of the upstream of the working machine comes to be identical with the working machine start-on clock value (at 179), the working machine is enabled. And, at the time when the clock signal comes to be identical with the working machine drive-off clock value, the working machine is disabled. The operation of the system according to the embodiment of the second aspect of the invention has been described above.

Figure 11:
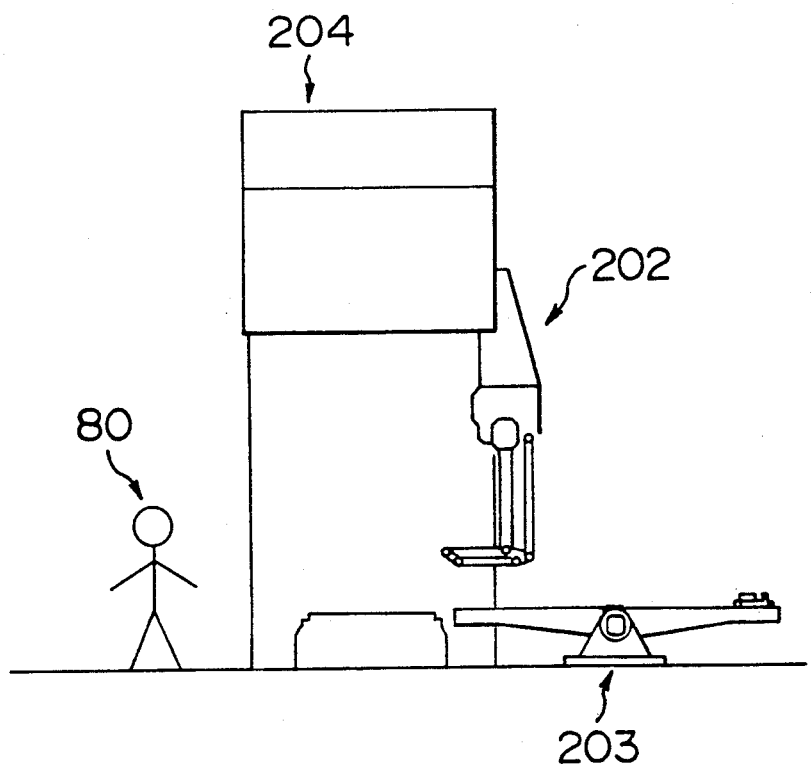
FIG. 11 is a schematic view showing an overall structure of an industrial robot system according to another aspect of the invention.

A robot system according to an embodiment of a third aspect of the invention will be explained. This system is illustrated as an example when the destack feeder 5, i.e., the work supplying unit and robot 1 (the first loader) has been removed from the system shown in FIG. 1, as shown in FIG. 11. In this system, the work is cast by an operator 80, and a start button, not shown, is depressed by him or her to thereby drive the system. A working machine 204 is the most upstream unit and serves as a master unit.

In this system, the operator depresses the start button so that, the working machine 204 is first driven. Thereafter, downstream robots 202 and 203 are driven in this order. In the case where the operator 80 has not yet depress the button for the next cycle even when the machine 204 completes the working and returns back to its original position, the machine is stopped at the original point and the other downstream robots are stopped at their respective original points in order. On the other hand, in the case where the operator depresses the button for the next cycle before the working machine has been returned back to the original point, the working machine and the robots are not stopped at their original points. As a result, these units are continuously operated for the next cycle. Also in this system, the contents of each process of the control are basically the same as those of the flowcharts shown from FIGS. 3a to 3i. The explanation will be made only as to the difference between them.

Figure 12A:
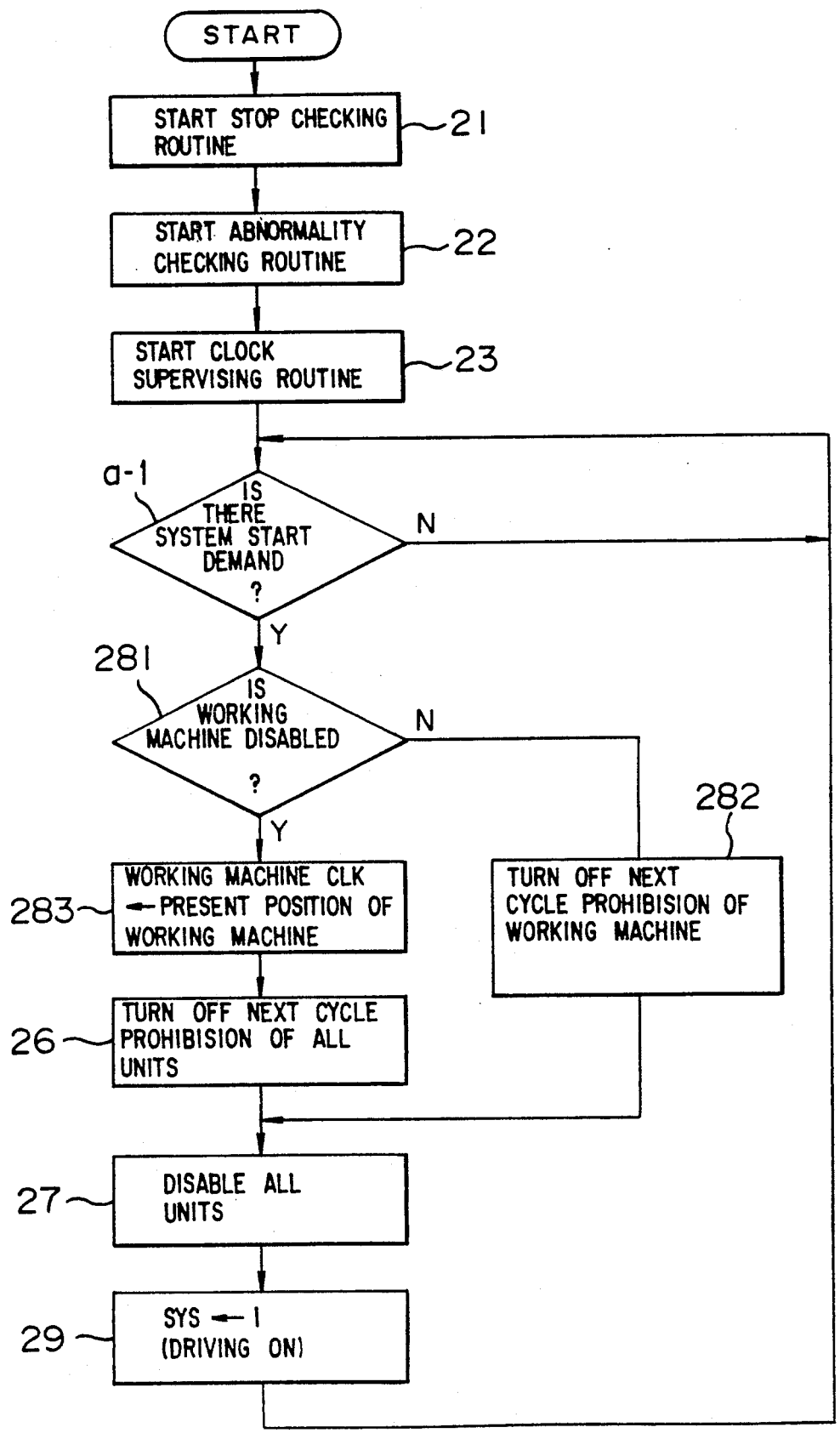
FIG. 12a is a flowchart showing a process of a system controlling section in the system shown in FIG. 11.
Figure 12B:
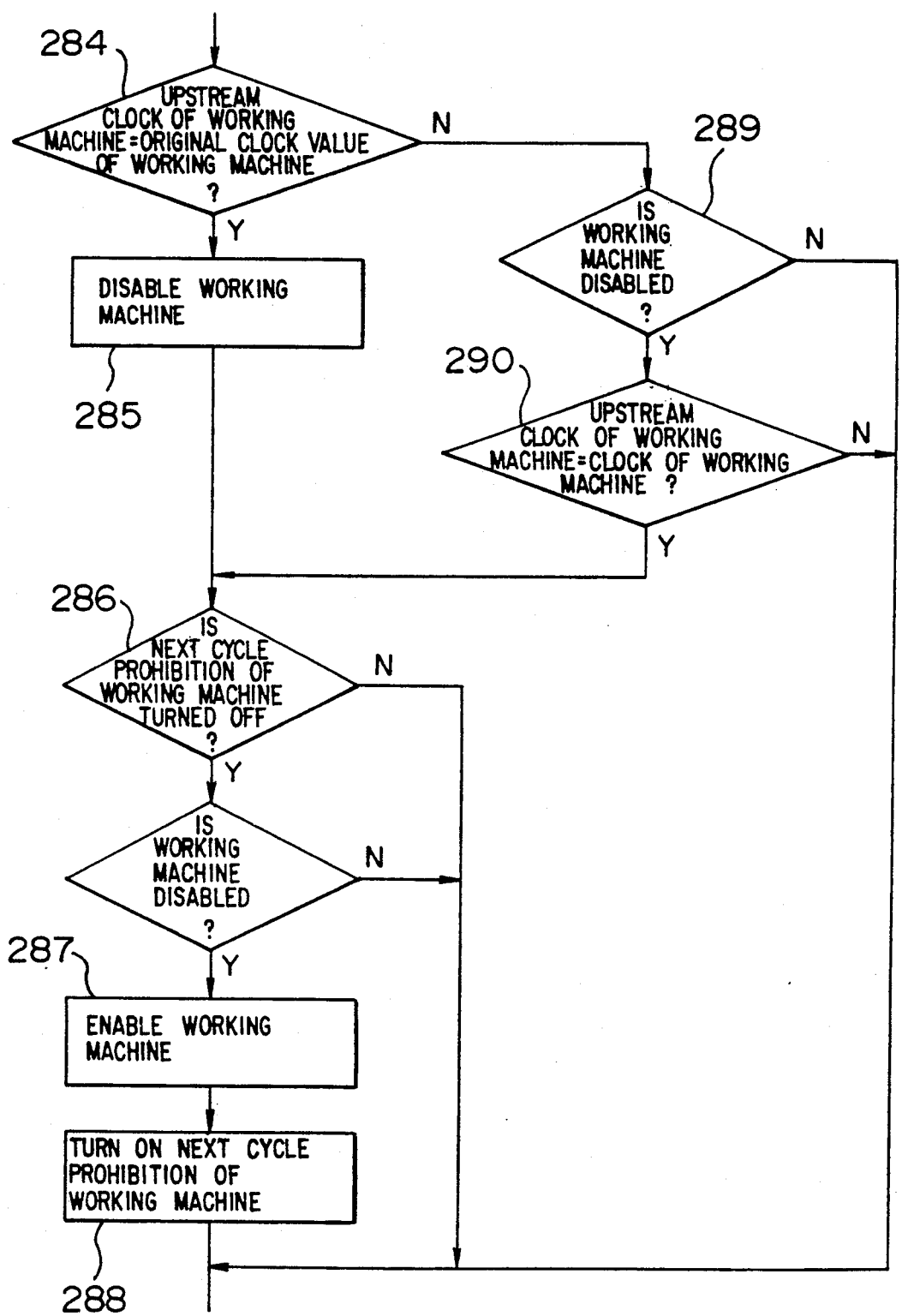
FIG. 12b is a flowchart showing a process of a clock supervising routine in the system shown in FIG. 11.

FIG. 12a shows a flowchart for the system controlling section. This flowchart is substantially the same as that shown in FIG. 3a except for blocks 281, 282 and 283. If the operator depresses the start button under the condition that the all the units are disabled, the machine is still kept under the disabled condition (step 281). The section reads out the present position of the working machine from a position detecting unit mounted on the machine and sets it to the machine clock as the clock value corresponding to this situation (step 283). Subsequently, the next cycle prohibition of all the units is turned off (step 26) and waits for the condition that all the units are enabled. Incidentally, the processing blocks in FIG. 12a, which are the same as those shown in FIG. 3a, are denoted by the same reference numerals used in FIG. 3a. The enabling check routine is constructed as shown in FIG. 12b. It is checked whether the signal of the clock on the upstream side of the working machine (in this embodiment, the system clock is the upstream clock since the working machine is the most upstream unit) comes to be identical with the working machine original point clock value (step 284). When the signal is identified with the working machine original point clock value, the working machine is once disabled (step 285). If the working machine is not subjected to the next cycle prohibition ON (step 286), the working machine is enabled (step 287), and at the same time, the next cycle prohibition of the working machine is turned on (step 288). Incidentally, the clock supervising routine shown in FIG. 12b corresponds to the processing block c-9 shown in FIG. 3c-(2).

Thus, since the most upstream working machine is subjected to the next cycle prohibition, the machine is operated during one cycle and is disabled at its original point. Since the disabling signal is transmitted to the downstream robots in order, the downstream robots are disabled in order. Accordingly, the operation of the system in one cycle is possible. When the start button is pressed for the next cycle during the situation where the working machine is disabled (before the stop at the original point), the process is branched from the block 281 shown in FIG. 12a to the block 282. In the block 282, the next cycle prohibition of the working machine, which is the most upstream unit is turned off, so that the working machine is kept operating continuously for the next cycle even if the machine is returned back to the original point. Since the upstream unit is enabled and the next cycle prohibition is turned off, the downstream robots also continuously enter the next cycle.

With such a system, since, when the working machine clock signal comes to be identical with the original clock value of the machine, the next cycle prohibition is again turned on, it is possible to disable the working machine at the next original point. Even if the working machine is once stopped by separating the start button due to work supply mistake in the midway of the working process, the clock value corresponding to the present position of the working machine is preset in the step 283 shown in FIG. 12a when the operator again depresses the start button. Subsequently, in steps 289 and 290 of FIG. 12b, even if the signal of the working machine clock is not the original point clock value, if the signal of the clock of the upstream unit comes to be identical with the thus preset machine clock value, the machine is enabled. Thus, it is possible to realize the halfway start of the machine.

The difference between the system of this embodiment and that of the foregoing embodiment has bee explained above. By thus processing, it is possible to operate the system in a continuous manner or in a one cycle manner in synchronism with the operator's depression of the start button.

Figure 13:
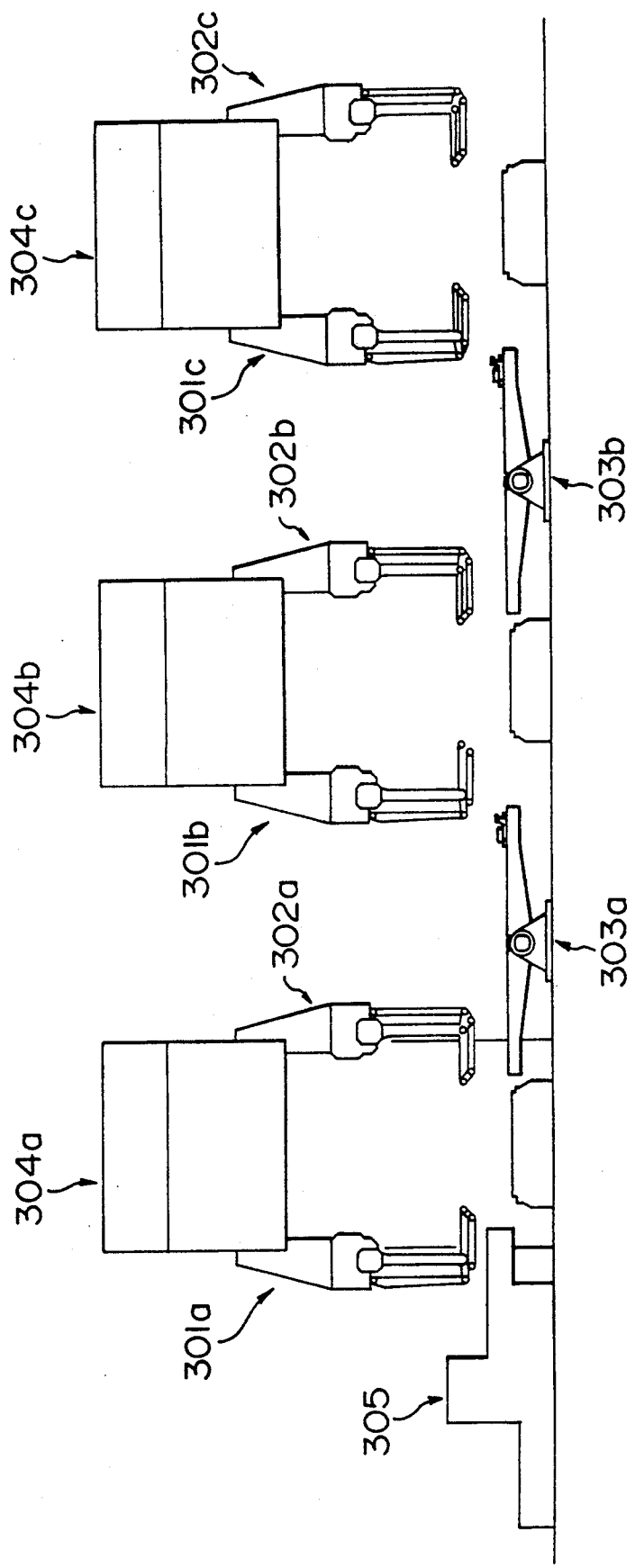
FIG. 13 is a schematic view showing an overall structure of an industrial composite robot system in accordance with an embodiment of still another aspect of the invention.

Referring to FIG. 13, there is shown a robot system according to an embodiment of a fourth aspect of the invention, which includes a plurality of combinations each having three robots and the single working machine shown in FIG. 1, in a series manner. Each combination is the system according to the embodiment of the second aspect of the invention described above, and a robot 301a of system No. 1 receives a work (not shown) from a work supply unit 305 so that a working machine 304a carries out the working. Thereafter, a robot 303a which is a shuttle feeder transfers the work through a robot 302a to a robot 301b of system No. 2, so that the work is machined in a working machine 304b of the system No. 2. Furthermore, similar transfer and working are carried out by a robot 303b, a robot 301c, a working machine 304 and a robot 302c of system No. 3, so that the work is conveyed from the system No. 1 to the system No. 3.

The robot control units of the systems No. 1 to No. 3 each have the structure shown in the system block diagram shown in FIG. 2 to which the structure corresponding to the additional unit is added. The process therefor is the same as that according to the embodiment of the second aspect of the invention. In each interconnection between the systems, the system clock, the enabling/disabling, the work existence/absence, the next cycle prohibition-on/off, the work transfer condition, the original flag on/off of the respective upstream systems are connected with the control units between the most upstream unit of one system and the most downstream unit of the previous system, and between the most downstream unit of the one system and the most upstream unit of the following system. Thus, the most upstream unit (the robot of the system 1 in this case) of the composite system serves as a master unit, and it is possible to realize the same process as if all the robots and all the working machines would be processed in the upstream/downstream relationship only by a single control unit.

Although the present invention has been described on the basis of the embodiments, it should be appreciated that the present invention is not limited solely to these specific forms and various modifications are possible to be made or the invention may be embodied in other forms without departing from the scope of the appended claims.

What is claimed is:

1. An industrial robot system comprising:
a single work supply unit:
at least one working machine;
a plurality of robots, each having at least one axis, arranged for conveying a work from the work supply unit to the working machine and a machined work from the working machine;
a single teaching controller for moving the robots to perform teaching and commanding recordation of positions of the robots; and
a single robot control unit, said control unit including:
(a) a system clock and clocks for the respective robots and the working machine, each set so as to add a predetermined increment value in every constant basic time and to reach a predetermined saturation value just in a cycle time of a system to start again addition from zero;

(b) a program forming means for recording clock values and corresponding robot positions for each robot;

(c) a registering means for setting an original point which is a waiting point before start of operation for each robot and selecting any step of a program as the original point to thereby register the original point correspondingly to the clock;

(d) a setting means having a position detecting means on one axis of the working machine and causing said position detecting means to correspond to the clock of the working machine for setting, as an original clock value of the working machine, an original point which is a waiting position before start of operation for the working machine;

(e) a setting means for setting an original point clock value of the most upstream one of the robots and the working machine in a work conveying direction as an original point clock value of the system;

(f) a means for providing and setting, in a case where it is possible to judge that any operational interference and accidental release of the work may not occur even if continuing operation of each of the robots and the working machine up to the original point rather than stopping the operation according to a stop command during the operation of the system, a safety operational range within which the operation is continued from a present step or position to the original point step or position except for an emergency stop;

(g) a means for, upon occurrence of abnormality, causing an abnormal one of the robots and the working machine to stop in a predetermined safety manner, transmitting, at the same time, the stop to another one of the robots and the working machine on upstream and downstream sides in the work conveying direction to avoid any operational interference of the abnormal one with the other robots and working machine, judging whether or not the other one of the robots and the working machine receiving the stop is in the safety operation range, determining one of stop and continuation of the operation up to the original point, if the stop is determined, transmitting the stop to further another one of the other robots and the working machine which is likely to interfere with the other one of the robots and the working machine to be stopped to successively transmit the stop to remainder of the other robots and the working machine as necessary to avoid any interference in the system;

(h) a means, having availability/unavailability signals for controlling a supply of power to the respective robots and the working machine, for setting to an availability, when teaching one of the robots, only the robot to be taught and supplying the power to necessary ones of the robots and the working machine upon trial to ensure the operator's safety;

(i) a means for controlling informations of the work, said controlling means having
  1) work conveyance counterpart numbers each representing which one of the robots and the working machine should be handed the work of another one of the robots and the working machine,
  2) transfer method numbers each for defining one of transfer methods of transferring the work released from the one of the robots and said working machine and taking the work by the another one of the robots and the working machine, and
  3) work condition data representative of whether or not the work is machined,
  to judge at any time condition of the work and a next process of the work;

(j) an enabling signal generating means for advancing each of the clocks by adding an increment value to the clock and controlling whether to actually operate the units;

(k) a means for enabling the system clock during drive of the system if the work supply unit has the work, to advance the system clock, enabling the most upstream one of the robots and the working machine in the work conveyance direction at time when the original point clock value of the most upstream one comes to coincide with the system clock value, to advance the clock of the most upstream one, and successively disabling downstream ones of the robots and the working machine in order whenever the clock of the most upstream one comes to coincide with the original point clock values of the downstream ones of the robots and the working machine if they hold the work, to start their operation, thereby synchronizing all the clocks of the robots and the working machine;

(l) a means for effecting one of a method of moving to and stopping at the original point, one of the robots and the working machine holding the work without releasing the work and a method of stopping the one at a present site thereof by the judgment of abnormality, in case where another one of the robots and the working machine downstream of the one of the robots and the working machine cannot receive the work in spite of a clock value of a position where the one of the robots and the working machine transfers the work to the other one of the downstream robots and the working machine;

(m) a means for calculating a position which each robot should reach in every basic time period during the operation, said calculating means
  1) determining a difference between a value of the clock of a present step and a value of the clock of a next step,
  2) solving a calculation number which represent how many times of increment of the clock the different corresponds,
  3) obtaining an increment value of the position by dividing the difference between a target position to be reached and the present position by the calculation number,
  4) obtaining a first complementary point by adding the increment value to the present position, and
  5) obtaining a n-th complementary point by repeating steps from above 3), if the calculation number subtracted by 1 is not zero,
  whereby successively complementing the positions and calculating the positions in synchronism with the clock;

(n) a means for initializing a corresponding position of the working machine as the clock value of the working machine in one of cases where the system is started from a stop condition and the system is again driven from a temporary stop condition, and for initializing the system clock to the clock value of the working machine in the same manner;

(o) a controlling means for always supervising an error between the clock value and a detected position of the working machine, and identifying the clock with a corresponding position of the working machine by increasing and decreasing the increment value of the clock; and (p) a means for judging a synchronism abnormality to stop the system in a safety manner, in case where, even if synchronism control is effected by the controlling means (o), a deviation between a detected position of the working machine and a corresponding clock value thereof a predetermined allowance range.

2. An industrial robot system comprising:
a single work supply unit;
at least one working machine;
a plurality of robot, each having at least one axis, arranged for conveying a work from said work supply unit to said working machine and a machined work from the working machine;
a single teaching controller for moving said robots to perform teaching and commanding recordation of positions of said robots; and
a single robot control unit, said control unit including:

(a) a system clock and clocks for the respective robots and the working machine, each set so as to add a predetermined increment value in every constant basic time and to reach a predetermined saturation value just in a cycle time of a system to start again addition from zero;

(b) a program forming means for recording clock values and corresponding robot position for each robot;

(c) a registering means for setting an original point which is a waiting point before start of operation for each robot and selecting any step of a program as the original point to thereby register the original point correspondingly to the clock;

(d) a setting means having a position detecting means on one axis of the working machine and causing said position detecting means to correspond to the clock of the working machine for setting, as an original point clock value of the working machine, an original point which is a waiting position before start of operation for the working machine;

(e) a setting means for setting an original point clock value of the most upstream one of the robots and the working machine is a work conveying direction as an original point clock value of the system;

(f) a means for providing and setting, in a case where it is possible to judge that any operational interference and accidental release of the work may not occur even if continuing operation of each of the robots and the working machine up to the original point rather than stopping the operation according to a stop command during the operation of the system, a safety operational range within which the operation is continued from a present step or position to the original point step or position except for an emergency stop;

(g) a means for, upon occurrence of abnormality, causing an abnormal one of the robots and the working machine to stop in a predetermined safety manner, transmitting, at the same time, the stop to another one of the robots and the working machine on upstream and downstream sided in the work conveying direction to avoid any operational interference of the abnormal one with the other robots and working machine, judging whether or not the other one of the robots and the working machine receiving the stop is in the safety operation range, determining one of stop and continuation of the operation up to the original point, if the stop is determined, transmitting the stop to further another one of the other robots and the working machine which is likely to interfere with the other one of the robots and the working machine to be stopped to successively transmit the stop to remainder of the other robots and the working machine as necessary, to avoid any interference in the system;

(h) a means, having availability/unavailability signals for controlling a supply of power to the respective robots and the working machine, for setting to an availability, when teaching one of the robots, only the robot to be taught and supplying the power to necessary ones of the robots and the working machine upon trial to ensure the operator's safety;

(i) a means for controlling informations of the work, said controlling means having
  1) work conveyance counterpart numbers each representing which one of the robots and the working machine should hand the work another one of the robots and the working machine,
  2) transfer method numbers for each defining one of transfer methods of transferring the work released from the one of the robots and said working machine and taking the work by the another one of the robots and the working machine, and
  3) work condition data representative of whether or not the work is machined,
to judge at any time condition of the work and a next process of the work;

(j) an enabling signal generating means for advancing each of the clocks by adding an increment value to the clock and controlling whether to actually operate the units;

(k) a means for enabling the system clock during drive of the system if the work supply unit has the work, to advance the system clock, enabling the most upstream one of the robots and the working machine in the work conveyance direction at time when the original point clock value of the most upstream one comes to coincide with the system clock value, to advance the clock of the most upstream one, and successively disabling downstream ones of the robots and the working machine in order whenever the clock of the most upstream one comes to coincide with the original point clock values of the downstream ones of the robots and the working machine if they hold the work, to start their operation, thereby synchronizing all the clocks of the robots and the working machine;

(l) a means for effecting one of a method of moving to and stopping at the original point, one of the robots and the working machine holding the work without releasing the work and a method of stopping the one at a present site thereof by the judgment of abnormality, in case where another one of the robots and the working machine downstream of the on of the robots and the working machine cannot receive the work in spite of a clock value of a position where the one of the robots and the working machine transfers the work to the other one of the downstream robots and the working machine;

(m) a means for calculating a position which each robot should reach in every basic time period during the operation, said calculating means
1) determining a difference between a value of the clock of a present step and a value of the clock of a next step,
2) solving a calculation number which represent how many times of increment of the clock the different corresponds,
3) obtaining an increment value of the position by dividing the difference between a target position to be reached and the present position by the calculation number,
4) obtaining a first complementary point by adding the increment value to the present position, and
5) obtaining a n-th complementary point by repeating steps from above 3), if the calculation number subtracted by 1 is not zero,
whereby successively complementing the positions and calculating the positions in synchronism with the clock;

(n) an intermittent operation controlling means for the working machine, for synchronizing a position of the working machine with the clock of the working machine, by setting and operating an operational cycle time of the working machine at a level shorter than the cycle time of the system, and turning the enabling signal on to impart an operation start command to the working machine at any time of the clock of the working machine so that the working machine clock comes to coincide with the detected position of the working machine which operates faster than the clock; and (o) a means for judging a synchronism abnormality to stop the system in a safety manner, in case where, even if synchronism control is effected by the controlling means (n), a deviation between a detected position of the working machine and a corresponding clock value there of exceeds a predetermined allowance range.

3. An industrial robot system comprising:
at least one working machine;
a plurality of robot, each having at least one axis, arranged for conveying a machined work from the working machine;
a single teaching controller for moving said robots to perform teaching and commanding recordation of positions of said robots; and
a single robot control unit, said control unit including:

(a) a system clock and clocks for the respective robots and the working machine, each set so as to add a predetermined increment value in every constant basic time and to reach a predetermined saturation value just in a cycle time of a system to start again addition from zero;

(b) a program forming means for recording clock values and corresponding robot position for each robot;

(c) a registering means for setting an original point which is a waiting point before start of operation for each robot and selecting any step of a program as the original point to thereby register the original point correspondingly to the clock;

(d) a setting means having a position detecting means on one axis of the working machine and causing said position detecting means to correspond to the clock of the working machine for setting, as an original point clock value of the working machine, an original point which is a waiting position before start of operation for the working machine;

(e) a setting means for setting an original point clock value of the most upstream one of the robots and the working machine is a work conveying direction as an original point clock value of the system;

(f) a means for providing and setting, in a case where it is possible to judge that any operational interference and accidental release of the work may not occur even if continuing operation of each of the robots and the working machine up to the original point rather than stopping the operation according to a stop command during the operation of the system, a safety operational range within which the operation is continued from a present step or position to the original point step or position except for an emergency stop;

(g) a means for, upon occurrence of abnormality, causing an abnormal one of the robots and the working machine to stop in a predetermined safety manner, transmitting, at the same time, the stop to another one of the robots and the working machine on upstream and downstream sided in the work conveying direction to avoid any operational interference of the abnormal one with the other robots and working machine, judging whether or not the other one of the robots and the working machine receiving the stop is in the safety operation range, determining one of stop and continuation of the operation up to the original point, if the stop is determined, transmitting the stop to further another one of the other robots and the working machine which is likely to interfere with the other one of the robots and the working machine to be stopped to successively transmit the stop to remainder of the other robots and the working machine as necessary, to avoid any interference in the system;

(h) a means, having availability/unavailability signals for controlling a supply of power to the respective robots and the working machine, for setting to an availability, when teaching one of the robots, only the robot to be taught and supplying the power to necessary ones of the robots and the working machine upon trial to ensure the operator's safety;

(i) a means for controlling informations of the work, said controlling means having
1) work conveyance counterpart numbers each representing which one of the robots and the working machine should be handed the work of another one of the robots and the working machine,
2) transfer method numbers each for defining one of transfer methods of transferring the work released from the one of the robots and said working machine and taking the work by the another one of the robots and the working machine, and
3) work condition data representative of whether or not the work is machined,
to judge at any time condition of the work and a next process of the work;

(j) an enabling signal generating means for advancing each of the clocks by adding an increment value to the clock and controlling whether to actually operate the units;

(k) a means for enabling the system clock during drive of the system if the work supply unit has the work, to advance the system clock, enabling the most upstream one of the robots and the working machine in the work conveyance direction at time when the original point clock value of the most upstream one comes to coincide with the system clock value, to advance the clock of the most upstream one, and successively disabling downstream ones of the robots and the working machine in order whenever the clock of the most upstream one comes to coincide with the original point clock values of the downstream ones of the robots and the working machine if they hold the work, to start their operation, thereby synchronizing all the clocks of the robots and the working machine;

(1) a means for effecting one of a method of moving to and stopping at the original point, one of the robots and the working machine holding the work without releasing the work add a method of stopping the one at a present site thereof by the judgment of abnormality, in case where another one of the robots and the working machine downstream of the one of the robots and the working machine cannot receive the work in spite of a clock value of a position where the one of the robots and the working machine transfers the work to the other one of the downstream robots and the working machine;

(m) a means for calculating a position which each robot should reach in every basic time period during the operation, said calculating means
1) determining a difference between a value of the clock of a present step and a value of the clock of a next step,
2) solving a calculation number which represent how many times of increment of the clock the different corresponds,
3) obtaining an increment value of the position by dividing the difference between a target position to be reached and the present position by the calculation number,
4) obtaining a first complementary point by adding the increment value to the present position, and
5) obtaining a n-th complementary point by repeating steps from above 3), if the calculation number subtracted by 1 is not zero,
whereby successively complementing the positions and calculating the positions in synchronism with the clock;

(n) a means for initializing a corresponding position of the working machine as the clock value of the working machine in one of cases where the system is started from a stop condition and the system is again driven from a temporary stop condition, and for initializing the system clock to the clock value of the working machine in the same manner;

(o) a controlling means for always supervising an error between the clock value and a detected position of the working machine, and identifying the clock with a corresponding position of the working machine by increasing and decreasing the increment value of the clock; and (p) a means for judging a synchronism abnormality to stop the system in a safety manner, in case where, even if synchronism control is effected by the controlling means (o), a deviation between a detected position of the working machine and a corresponding clock value thereof a predetermined allowance range.

4. An industrial composite robot system including a plurality of robot systems each comprising:
at least one working machine;
a plurality of robot, each having at least one axis, arranged for conveying a work from said work supply unit to said working machine and a machined work from the working machine;
a single teaching controller for moving said robots to perform teaching and commanding recordation of positions of said robots; and
a single robot control unit, said control unit including:
(a) a system clock and clocks for the respective robots and the working machine, each set so as to add a predetermined increment value in every constant basic time and to reach a predetermined saturation value just in a cycle time of a system to start again addition from zero;
(b) a program forming means for recording clock values and corresponding robot position for each robot;
(c) a registering means for setting an original point which is a waiting point before start of operation for each robot and selecting any step of a program as the original point to thereby register the original point correspondingly to the clock;
(d) a setting means having a position detecting means on one axis of the working machine and causing said position detecting means to correspond to the clock of the working machine for setting, as an original point clock value of the working machine, an original point which is a waiting position before start of operation for the working machine;
(e) a setting means for setting an original point clock value of the most upstream one of the robots and the working machine is a work conveying direction as an original point clock value of the system;
(f) a means for providing and setting, in a case where it is possible to judge that any operational interference and accidental release of the work may not occur even if continuing operation of each of the robots and the working machine up to the original point rather than stopping the operation according to a stop command during the operation of the system, a safety operational range within which the operation is continued from a present step or position to the original point step or position except for an emergency stop;
(g) a means for, upon occurrence of abnormality, causing an abnormal one of the robots and the working machine to stop in a predetermined safety manner, transmitting, at the same time, the stop to another one of the robots and the working machine on upstream and downstream sided in the work conveying direction to avoid any operational interference of the abnormal one with the other robots and working machine, judging whether or not the other one of the robots and the working machine receiving the stop is in the safety operation range, determining one of stop and continuation of the operation up to the original point, if the stop is determined, transmitting the stop to further another one of the other robots and the working machine which is likely to interfere with the other one of the robots and the working machine to be stopped to successively transmit the stop to remainder of the other robots and the working machine as necessary, to avoid any interference in the system;

(h) a means, having availability/unavailability signals for controlling a supply of power to the respective robots and the working machine, for setting to an availability, when teaching one of the robots, only the robot to be taught and supplying the power to necessary ones of the robots and the working machine upon trial to ensure the operator's safety;

(i) a means for controlling informations of the work, said controlling means having
  1) work conveyance counterpart numbers each representing which one of the robots and the working machine should be handed the work of another one of the robots and the working machine,
  2) transfer method numbers each for defining one of transfer methods of transferring the work released from the one of the robots and said working machine and taking the work by the another one of the robots and the working machine, and
  3) work condition data representative of whether or not the work is machined,
  to judge at any time condition of the work and a next process of the work;

(j) a means for supplying to a previous system an information concerning the above-mentioned paragraph (i) of the most upstream one of the robots and the working machine of one system, and for supplying the same information to a following system;

(k) an enabling signal generating means for advancing each of the clocks by adding an increment value to the clock and controlling whether to actually operate the units;

(1) a means for enabling the system clock during drive of the system if the work supply unit has the work, to advance the system clock, enabling the most upstream one of the robots and the working machine in the work conveyance direction at time when the original point clock value of the most upstream one comes to coincide with the system clock value, to advance the clock of the most upstream one, and successively disabling downstream ones of the robots and the working machine in order whenever the clock of the most upstream one comes to coincide with the original point clock values of the downstream ones of the robots and the working machine if they hold the work, to start their operation, thereby synchronizing all the clocks of the robots and the working machine;

(m) a means for effecting one of a method of moving to and stopping at the original point, one of the robots and the working machine holding the work without releasing the work and a method of stopping the one at a present site thereof by the judgment of abnormality, in case where another one of the robots and the working machine downstream of the one of the robots and the working machine cannot receive the work in spite of a clock value of a position where the one of the robots and the working machine transfers the work to the other one of the downstream robots and the working machine;

(n) a means for calculating a position which each robot should reach in every basic time period during the operation, said calculating means
  1) determining a difference between a value of the clock of a present step and a value of the clock of a next step,
  2) solving a calculation number which represent how many times of increment of the clock the different corresponds,
  3) obtaining an increment value of the position by dividing the difference between a target position to be reached and the present position by the calculation number,
  4) obtaining a first complementary point by adding the increment value to the present position, and
  5) obtaining a n-th complementary point by repeating steps from above 3), if the calculation number subtracted by 1 is not zero,
  whereby successively complementing the positions and calculating the positions in synchronism with the clock;

(o) a means for initializing a corresponding position of the working machine as the clock value of the working machine in one of cases where the system is started from a stop condition and the system is again driven from a temporary stop condition, and for initializing the system clock to the clock value of the working machine in the same manner;

(p) an intermittent operation controlling means for the working machine, for synchronizing a position of the working machine with the clock of the working machine, by setting and operating an operational cycle time of the working machine at a level shorter than the cycle time of the system, and turning the enabling signal on to impart an operation start command to the working machine at any time of the clock of the working machine so that the working machine clock comes to coincide with the detected position of the working machine which operates faster than the clock; and (q) a means for judging a synchronism abnormality to stop the system in a safety manner, in case where, even if synchronism control is effected by the controlling means (p), a deviation between a detected position of the working machine and a corresponding clock value thereof exceeds a predetermined allowance range.

* * * * *

UNITED STATES PATENT AND TRADEMARK OFFICE
CERTIFICATE OF CORRECTION

PATENT NO.   :   5,084,826
DATED        :   January 28th, 1992
INVENTOR(S)  :   Kazuo HARIKI ET AL.

It is certified that error appears in the above-identified patent and that said Letters Patent is hereby corrected as shown below:

On the Title Page:

Please change [73] to read as follows

-- [73] Assignees: Nachi-Fujikoshi Corp., Toyama;
Miura Kogyo Kabushiki Kaisha, Hatsukaichi
Nihon Sogyo Kabushiki Kaisha, Hiroshima,
all of Japan Signed and Sealed this Nineteenth Day of July, 1994

Attest:

BRUCE LEHMAN

Attesting Officer

Commissioner of Patents and Trademarks